US010981495B2

(12) United States Patent
Kusayanagi et al.

(10) Patent No.: US 10,981,495 B2
(45) Date of Patent: Apr. 20, 2021

(54) DISPLAY CONTROL METHOD AND DISPLAY CONTROL DEVICE

(71) Applicant: Nissan Motor Co., Ltd., Yokohama (JP)

(72) Inventors: Yoshinori Kusayanagi, Kanagawa (JP); Seigo Watanabe, Kanagawa (JP); Takura Yanagi, Kanagawa (JP); Jeanphilippe Alexander, Kanagawa (JP); Tarek Saad, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 16/633,963

(22) PCT Filed: Jul. 28, 2017

(86) PCT No.: PCT/JP2017/027507
§ 371 (c)(1),
(2) Date: Jan. 24, 2020

(87) PCT Pub. No.: WO2019/021471
PCT Pub. Date: Jan. 31, 2019

(65) Prior Publication Data
US 2020/0269747 A1    Aug. 27, 2020

(51) Int. Cl.
*B60Q 1/34* (2006.01)
*B60K 35/00* (2006.01)
*B60W 30/08* (2012.01)
*G08G 1/16* (2006.01)
*B60Q 1/44* (2006.01)
*B60Q 1/14* (2006.01)
*B60Q 1/46* (2006.01)
*B60Q 9/00* (2006.01)

(52) U.S. Cl.
CPC ............... *B60Q 1/34* (2013.01); *B60K 35/00* (2013.01); *B60W 30/08* (2013.01);
(Continued)

(58) Field of Classification Search
CPC .......... B60Q 1/34; B60Q 1/1407; B60Q 1/44; B60Q 9/00; B60Q 1/346; B60Q 1/46;
(Continued)

(56) References Cited

U.S. PATENT DOCUMENTS 5,444,629 A * 8/1995 Kishi ................. G01C 21/3629
340/990
8,085,140 B2 * 12/2011 Mochizuki ............ B60W 40/08
340/438
(Continued)

FOREIGN PATENT DOCUMENTS

JP    2003194566 A    7/2003
JP    2004331023 A    11/2004
(Continued)

*Primary Examiner* — Nimeshkumar D Patel
*Assistant Examiner* — Tania Courson
(74) *Attorney, Agent, or Firm* — Young Basile Hanlon & MacFarlane, P.C.

(57) ABSTRACT

A display control device includes: a turn signal installed in a vehicle; indicators for displaying a lighting state of the turn signal to an occupant of the vehicle; and a controller for controlling the lighting state of the turn signal and a lighting state of the indicators. The controller makes timing of starting to turn on the turn signal and timing of starting to turn on the indicators different from each other.

8 Claims, 15 Drawing Sheets

(52) U.S. Cl.
CPC .. *B60K 2370/131* (2019.05); *B60K 2370/175* (2019.05); *B60K 2370/178* (2019.05); *B60K 2370/179* (2019.05); *B60Q 1/1407* (2013.01); *B60Q 1/346* (2013.01); *B60Q 1/44* (2013.01); *B60Q 1/46* (2013.01); *B60Q 9/00* (2013.01); *G08G 1/162* (2013.01); *G08G 1/167* (2013.01)

(58) Field of Classification Search
CPC .. G08G 1/167; G08G 1/162; B60K 2370/175; B60K 2370/178; B60K 2370/179; B60K 2370/131; B60K 35/00; B60W 30/08
See application file for complete search history.

(56) References Cited

U.S. PATENT DOCUMENTS

| | | | |
|---|---|---|---|
| 8,423,246 B2 * | 4/2013 | Takeda | B62D 5/006 |
| | | | 701/41 |
| 8,847,771 B2 * | 9/2014 | Gunaratne | G08B 21/0476 |
| | | | 340/576 |
| 8,924,140 B2 * | 12/2014 | Sakamoto | G01S 13/867 |
| | | | 701/301 |
| 2006/0217861 A1 * | 9/2006 | Ihara | B62D 15/029 |
| | | | 701/41 |
| 2006/0293843 A1 * | 12/2006 | Morita | G01C 21/30 |
| | | | 701/442 |
| 2010/0156617 A1 | 6/2010 | Nakada et al. | |

FOREIGN PATENT DOCUMENTS

| | | |
|---|---|---|
| JP | 2005001582 A | 1/2005 |
| JP | 2007283933 A | 11/2007 |
| JP | 2008037167 A | 2/2008 |
| JP | 200887711 A | 4/2008 |
| JP | 2008285095 A | 11/2008 |
| JP | 2010039870 A | 2/2010 |
| JP | 4625544 B2 | 2/2011 |
| JP | 201730436 A | 2/2017 |
| JP | 201797495 A | 6/2017 |

* cited by examiner

DISPLAY CONTROL METHOD AND DISPLAY CONTROL DEVICE

TECHNICAL FIELD

The present invention relates to a display control method and a display control device.

BACKGROUND

There is a conventionally-known technique of, during automated driving, informing other vehicles around a host vehicle that the host vehicle is going to change lanes (Japanese Patent Application Publication No. 2017-30436). The invention disclosed in Japanese Patent Application Publication No. 2017-30436 is configured such that after an occupant of the host vehicle manipulates a winker switch for changing lanes, if a vehicle which hinders the lane change is detected around the host vehicle, no turn signal is turned on until the detected vehicle goes so far away from the host vehicle that the host vehicle can change lanes safely.

SUMMARY

The invention disclosed in Japanese Patent Application Publication No. 2017-30436, however, sometimes turns on no turn signal during the automated driving regardless of the occupant's intention of making a left or right turn, as well as changing lanes. This may cause the occupant to feel discomfort while the occupant is riding the vehicle.

The present invention has been made with the above problem taken into consideration. An object of the present invention is to provide a display control method and a display control device which are capable of making an occupant less likely to feel discomfort while the occupant is riding a vehicle.

A display control method according to an aspect of the present invention makes timing of starting to turn on a turn signal and timing of starting to turn on an indicator different from each other.

The present invention makes it possible to make an occupant less likely to feel discomfort while the occupant is riding a vehicle.

DETAILED DESCRIPTION

Figure 1:
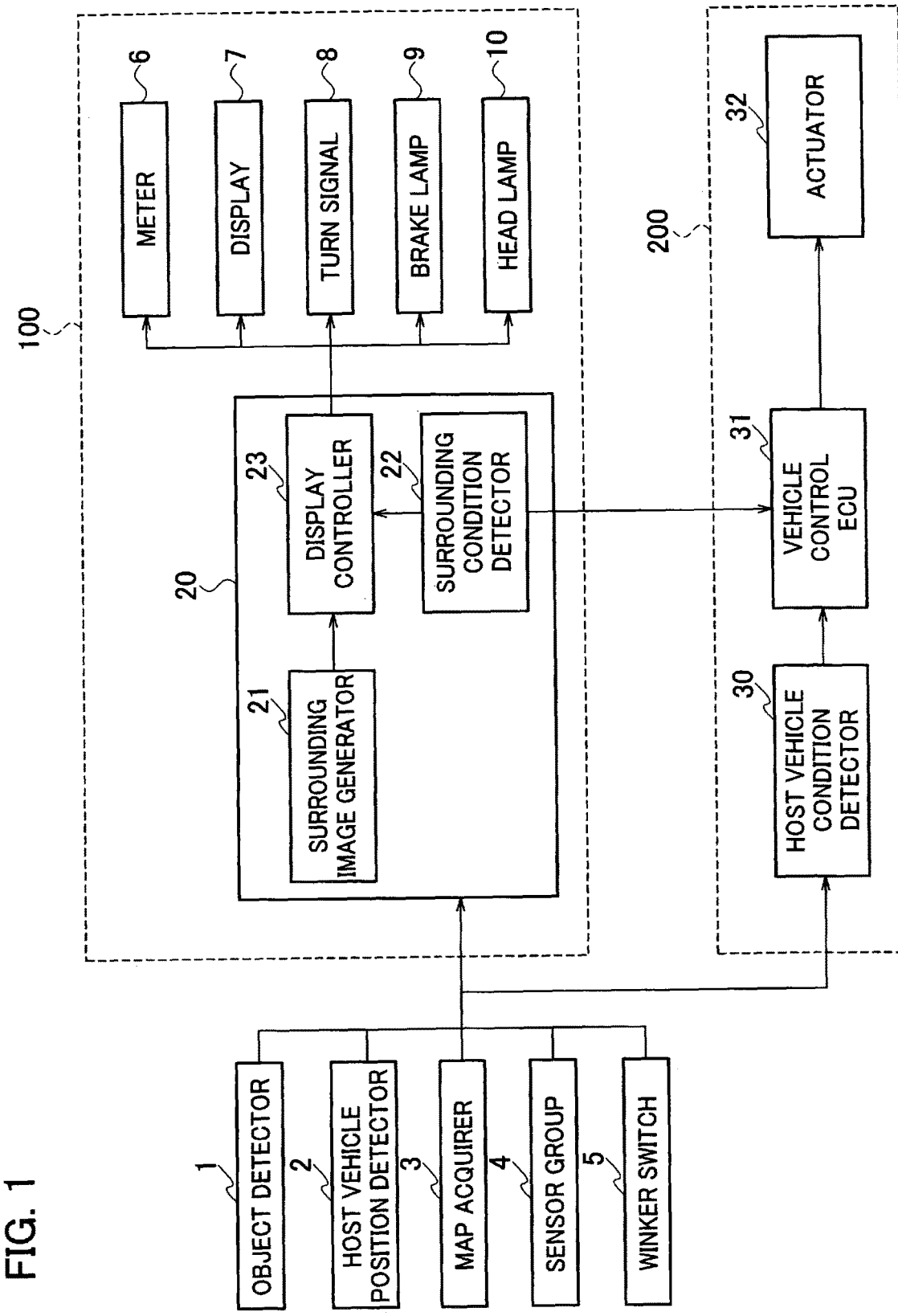
FIG. 1 is a configuration diagram of a display control device according to an embodiment of the present invention.

Referring to the drawings, descriptions will be hereinbelow provided for an embodiment of the present invention. Throughout the illustrations in the drawings, the same components will be denoted by the same reference signs, and descriptions for such components will be omitted.

(Configuration of Display Control Device)

As illustrated in FIG. 1, a vehicle according to the embodiment includes a display control device 100, a vehicle control device 200, an object detector 1, a host vehicle position detector 2, a map acquirer 3, a sensor group 4, and a winker switch 5. The display control device 100 includes a controller 20, a meter 6, a display 7, a turn signal 8, a brake lamp 9, and a head lamp 10. The vehicle control device 200 includes a host vehicle condition detector 30, a vehicle control ECU 31 (a vehicle control unit), and an actuator 32. The display control device 100 according to the embodiment is applied to a vehicle capable of changing between automated driving and manual driving. Incidentally, the display control device 100 may include the object detector 1, the host vehicle position detector 2, the map acquirer 3, the sensor group 4, and the winker switch 5. In the following descriptions, an occupant means a person who is in the host vehicle until otherwise specified.

The object detector 1 includes multiple different types of object detection sensors installed in the host vehicle. The multiple different types of object detection sensors include a laser radar, a millimeter-wave radar, a camera, a laser range finder, inter-vehicle communications, road-vehicle communications, and the like. The object detector 1 detects objects around the host vehicle using the multiple object detection sensors. More specifically, the object detector 1 detects: moving objects, including other vehicles, bikes, bicycles and pedestrians; and still objects, including parked vehicles. For example, the object detector 1 detects the position, orientation (yaw angle), size, velocity, acceleration, deceleration and a yaw rate of each of the moving and still objects relative to the host vehicle. The object detector 1 outputs the detected information to the controller 20 and the host vehicle condition detector 30.

The host vehicle position detector 2 includes position detection sensors, such as the Global Positioning System (GPS) and the odometry, which are installed in the host vehicle and measures the absolute position of the host vehicle. The host vehicle position detector 2 detects the absolute position of the host vehicle, that is, the position and orientation of the host vehicle relative to a predetermined reference point, using the position detection sensors. The host vehicle position detector 2 outputs the detected information to the controller 20 and the host vehicle condition detector 30.

The map acquirer 3 acquires map information representing the structure of a road which the post vehicle runs. The map information acquired by the map acquirer 3 includes road structure information representing lanes' absolute positions, relationships among connecting lanes, and the lanes' relative positional relationships. The map acquirer 3 may possess a map database which stores the map information, or may acquire the map information from an external map data server by cloud computing. Otherwise, the map acquirer 3 may acquire the map information using the inter-vehicle communications and the road-vehicle communications. The map acquirer 3 outputs the detected information to the controller 20 and the host vehicle condition detector 30.

The sensor group 4 includes multiple sensors for detecting the condition of the host vehicle. The sensor group 4 includes, for example, a vehicle speed sensor, a shift sensor, and a steering sensor. The sensor group 4 detects the vehicle speed, shift position, steering position and so on, and outputs them to the controller 20 and the host vehicle condition detector 30.

The winker switch 5 is installed near the driver's seat, and detects the turn direction of the host vehicle while the host vehicle is making a left or right turn, or changing lanes. The winker switch 5 outputs the detected turn direction to the controller 20 and the host vehicle condition detector 30.

The controller 20 acquires the information from the object detector 1, the host vehicle position detector 2, the map acquirer 3, the sensor group 4, and the winker switch 5. Using the acquired information, the controller 20 generates a surrounding image presenting a condition of the surroundings of the host vehicle, and controls displays respectively on the meter 6 and the display 7.

The controller 20 is a general-purpose microcomputer including a central processing unit (CPU), a memory and an input/output unit. Computer programs for causing the microcomputer to function as the display control device 100 are installed in the microcomputer. The microcomputer functions as multiple information processing circuits included in the display control device 100 by executing the computer programs. This embodiment shows the example where the software realizes the multiple information processing circuits included in the display control device 100. It is a matter of course, however, that the information processing circuits may be formed for dedicated hardware prepared to perform the following information processing. Furthermore, the multiple information processing circuits may be formed from their respective pieces of hardware.

The controller 20 includes a surrounding image generator 21, a surrounding condition detector 22 and a display controller 23 as the multiple information processing circuits.

Based on an image of the surroundings of the host vehicle, the surrounding image generator 21 sets predetermined virtual viewpoint and projection plane, and generates the surrounding image viewed downward from above the host vehicle (in the vehicle direction). Incidentally, the surrounding image may be a looked-down image, a bird's eye image, or the like. It does not matter which image form is employed for the surrounding image, as long as the image form helps to recognize the host vehicle and the condition of the surroundings of the host vehicle. In addition, the technique of generating the looked-down image and the bird's eye image is a conventional one, and detailed description for the technique will be omitted.

The surrounding condition detector 22 detects the condition of the surroundings of the host vehicle. The condition of the surroundings of the host vehicle means whether other vehicles, bikes, bicycles, pedestrians and the like are present around the host vehicle. Furthermore, the condition of the surroundings of the host vehicle includes positions and speeds of the other vehicles and the like relative to the host vehicle.

The display controller 23 controls various displays depending on the condition of the surroundings of the host vehicle which is detected by the surrounding condition detector 22. The display controller 23 controls, mainly, the displays on the turn signal 8 and the winker indicator. Detailed descriptions will be provided later.

The meter 6 is a device, installed in an instrument panel near the driver's seat, for showing the occupant various pieces of information. The meter 6 includes a speedometer, a tachometer, and a winker indicator. Incidentally, the meter 6 may be formed from a liquid crystal display which is different from the later-described display 7. Furthermore, in the embodiment, the winker indicator displays a lighting state of the turn signal 8.

The display 7 is a device for showing the occupant various pieces of information, and is, for example, a navigation display installed in the vehicle compartment. The display 7 displays, for example, the surrounding image representing the conditions of the surroundings of the host vehicle. The display 7 further displays the condition of the vehicle control performed by the vehicle control ECU 31. The vehicle control includes automated driving and run assistance control, which include, for example, an automated lane change and an automated overtaking. The condition of the vehicle control includes a condition in which no vehicle controls is performed, a preparatory condition for the vehicle control, and a condition in which the vehicle control is being performed. While the vehicle control is being performed, the display 7 shows, for example, a display for showing that the host vehicle is changing lanes, a display for showing that the host vehicle is overtaking a vehicle in front, a display for showing a route for the lane change, and a display for showing an order in which the host vehicle, the preceding vehicle, the other vehicles around the host vehicle are running, for the purpose of enabling the occupant to know the contents of the vehicle control. The preparatory condition is a condition which precedes a run control, and which shows that the run control is going to be performed. While a preparation for the run control is underway, a display of the preparatory condition shows, for example, the contents of the run control which are going to be performed from now. That is to say, the display of the preparatory condition is a display intended to make the occupant know that the run control has not been performed yet and is going to be performed from now.

The turn signal 8 is a lighting device for informing the outside of the host vehicle of the steering direction of the host vehicle. The turn signal 8 is provided to, for example, the front left, front right, rear left and rear right of the host vehicle. In addition, the turn signal 8 blinks in response to the occupant's manipulation of the winker switch 5. Furthermore, the turn signal 8 blinks in response to the control by the controller 20 as well.

The brake lamp 9 is a lighting device for informing the outside of the host vehicle of deceleration of the host vehicle. The brake lamp 9 is provided to, for example, the rear left and right of the host vehicle. Furthermore, the brake lamp 9 starts to be continuously turned on by the occupant's braking and the controller 20's control. The head lamp 10 is a lighting device for enhancing the visibility from the occupant. The head lamp 10 is provided to, for example, the front left and right of the host vehicle. The head lamp 10 starts to be continuously turned on by the occupant's manipulation.

It should be noted that in the embodiment, being continuously turned on means that light is continuously turned on. In addition, blinking means that light is turned on and off repeatedly in certain cycles.

The host vehicle condition detector 30 detects the position, steering angle, speed and so on of the host vehicle, and outputs them to the vehicle control ECU 31.

Based on the data detected by the host vehicle condition detector 30 and the surrounding condition detector 22, the vehicle control ECU 31 calculates a run route reflecting the surrounding condition, and performs the vehicle control based on the run route. The vehicle control ECU 31 performs the automated control on the drive of the actuator 32 for driving, braking and steering the host vehicle. It should be noted that in the embodiment, the automated driving is performed by controlling at least one of actuators such as a brake actuator, and an accelerator actuator and a steering actuator without the occupant's manipulation. It does not matter, therefore, that the other actuators are operated in response to the occupant's manipulation. In addition, the automated driving may be performed by performing at least one of acceleration/deceleration control, horizontal position control, and the like. Furthermore, in the embodiment, the manual driving is performed by the occupant's manipulation of, for example, the brake, accelerator and steering wheel. It should be noted that the display control device 100 according to the embodiment is applicable to both the automated driving and the manual driving. Incidentally, in the following descriptions, the configuration related to the automated driving will be sometimes referred to as a "system."

(Example of How Display Control Device Works)

Figure 2A:
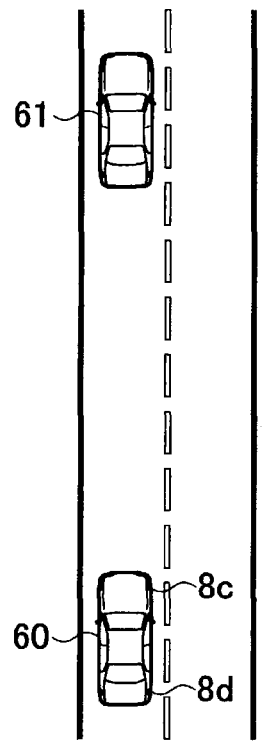
FIG. 2A is a diagram for explaining an example of how the display control device works for a lane change to be performed by automated driving.
Figure 2A:
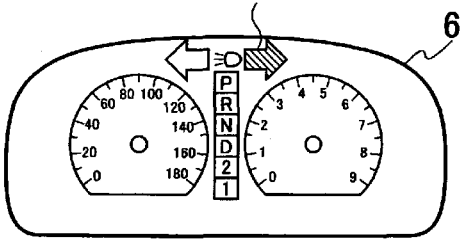
Figure 2A:
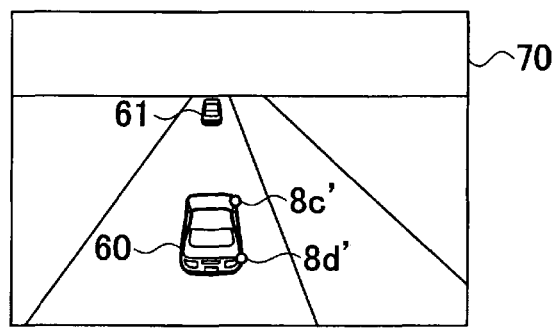
Figure 2B:
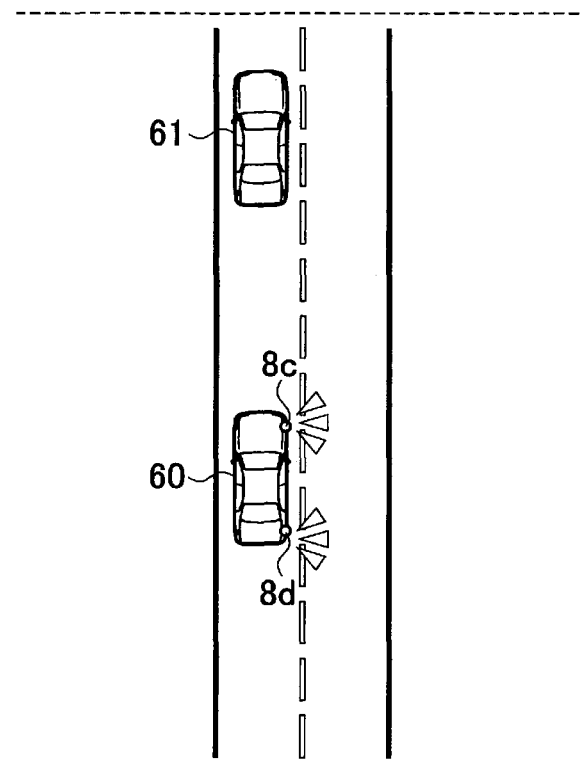
FIG. 2B is a diagram for explaining the example of how the display control device works for the lane change to be performed by the automated driving.
Figure 2B:
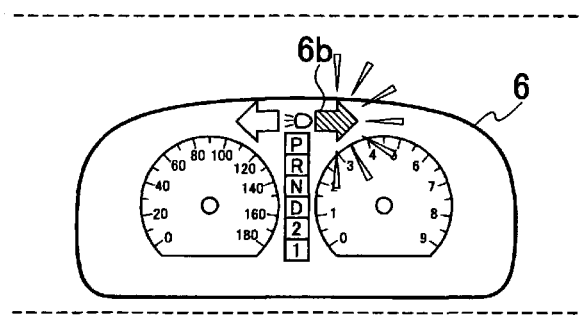
Figure 2B:
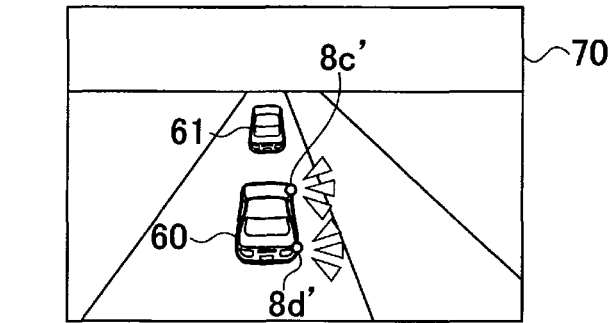

Referring to FIGS. 2A and 2B, descriptions will be provided for an example of how the display control device 100 works when a lane change is performed by the automated driving. The lane change performed by the automated driving includes a lane change based on the occupant's instruction, and a lane change based on the occupant's confirmation which is asked for by the system. To begin with, descriptions will be provided for the lane change based on the occupant's instruction.

A surrounding image 70 illustrated in FIG. 2A represents a condition of the surroundings of the host vehicle at time T1. Virtual turn signals 8c', 8d' illustrated in FIG. 2A are those in the surrounding image 70 on the display 7, and are different from actual turn signals 8c, 8d.

Let us assume that as illustrated in FIG. 2A, at time T1, the occupant detects a preceding vehicle 61, moving slower than the host vehicle 60, in front of the vehicle 60 in the same lane as the host vehicle 60 is moving.

In order to overtake the preceding vehicle 61, the occupant instructs a lane change by turning the winker switch 5 in the right direction. Upon receipt of the occupant's instruction, the surrounding condition detector 22 checks the condition of the surroundings of the host vehicle 60, and determines whether the lane change is allowed. In a case where the surrounding condition detector 22 determines that the lane change is allowed, the display controller 23 turns on the turn signals 8c, 8d, and the vehicle control ECU 31 starts the lane change. Thereafter, when the host vehicle 60 reaches the adjacent lane, the display controller 23 terminates the turning on of the turn signals 8c, 8d. Detailed descriptions will be hereinbelow provided for the lane change on a timing basis.

(1) Turn Signal Preparation Period

A turn signal preparation period is a period from the occupant's turning the winker switch 5 in the right direction through the display controller 23 starting to blink the turn signals 8c, 8d. The turn signals 8c, 8d start to blink at the same timing as the surrounding condition detector 22 determines that the lane change is allowed. Otherwise, the timing of starting to blink the turn signals 8c, 8d may come after the surrounding condition detector 22 determines that the lane change is allowed, but before the host vehicle 60 starts the lane change, that is to say, a predetermined time (for example, 3 seconds) before the host vehicle 60 starts the lane change. Incidentally, the timing of starting to blink the turn signals 8c, 8d is not limited to these examples. The timing of starting to blink the turn signals 8c, 8d may be determined arbitrarily.

During this turn signal preparation period, the display controller 23 keeps the winker indicator 6b in the meter 6 turned on, as illustrated in FIG. 2A. Through this turning on, the display controller 23 is capable of showing the occupant that the turn signals 8c, 8d is in preparation to be turned on (going to be turned on) for the lane change, although the turn signals 8c, 8d have not been turned on yet. Thereby, the occupant can exactly know what condition the host vehicle 60 is in. Furthermore, the display controller 23 keeps the virtual turn signals 8c', 8d' turned on in the display 7. Through this turning on, the display controller 23 is capable of showing the occupant that the turn signals 8c, 8d are in preparation to be turned on for the lane change, although the turn signals 8c, 8d have not been turned on yet. Thereby, the occupant can exactly know what condition the host vehicle 60 is in.

When the surrounding condition detector 22 starts to prepare for the lane change, the display controller 23 does not turn on the turn signals 8c, 8d, as illustrated in FIG. 2A. The reason for this is that the surrounding condition detector 22 checks that the condition of the surroundings of the host vehicle 60, and determined that condition is unsuitable for the lane change. The turn signals 8c, 8d which are turned on when the host vehicle 60 does not start the lane change at all or for a long time may adversely affect other vehicles around the host vehicle 60. For example, when the turn signals 8c, 8d are turned on, other vehicles (automated-driving vehicles) which detect this turning on may be suddenly braked to make distances between the vehicles and the host vehicle long enough. The sudden braking may make the occupants of other vehicles feel discomfort. With this taken into consideration, in the embodiment, even if the occupant manipulates the winker switch 5, the display controller 23 dose not turn on the turn signals 8c, 8d at least until the surrounding condition detector 22 determines that the lane change is allowed. Thereby, the display controller 23 is capable of inhibiting behavior (for example, the sudden braking of other vehicles) which makes the occupants of other vehicles feel discomfort.

Meanwhile, since the occupant has already manipulated the winker switch 5, the occupant may feel discomfort in the case where the system returns no response to the occupant. As discussed above, therefore, the display controller 23 starts to keep the winker indicator 6*b* turned on. In addition, the display controller 23 starts to keep the virtual turn signals 8*c*', 8*d*' turned on as well. Thereby, the display controller 23 is capable of informing the occupant that the preparation for the lane change has been started. By this, the occupant can recognize that the occupant's instruction is reflected, and can exactly know the condition of the host vehicle 60. Incidentally, the reason why the display controller 23 starts to keep the winker indicator 6*b* turned on is that if the display controller 23 would blink the winker indicator 6*b*, the occupant would misunderstand that the turn signals 8*c*, 8*d* are turned on although the turn signals 8*c*, 8*d* are not turned on, and would feel discomfort. In general, the winker indicator 6*b* and the turn signals 8*c*, 8*d* behave correspondingly. In other words, when the winker indicator 6*b* blinks, the turn signals 8*c*, 8*d* blink as well. When the winker indicator 6*b* turns off, the turn signals 8*c*, 8*d* turn off as well. Thus, if the display controller 23 did not turn on the turn signals 8*c*, 8*d* while blinking the winker indicator 6*b*, the occupant would feel discomfort. In the embodiment, therefore, the display controller 23 starts to keep the winker indicator 6*b* turned on, but does not turn on the turn signals 8*c*, 8*d*. Thereby, the display controller 23 is capable of making the occupant less likely to feel discomfort while the occupant is riding the vehicle. Furthermore, by not turning on the turn signals 8*c*, 8*d*, the display controller 23 is capable of preventing the other vehicles around the host vehicle 60 from being adversely affected.

In addition, in a case where the surrounding condition detector 22 checks the condition of the surroundings of the host vehicle 60 and determines that the lane change is allowed, the display controller 23 blinks the winker indicator 6*b*, as well as the turn signals 8*c*, 8*d*. The display controller 23 further blinks the virtual turn signals 8*c*', 8*d*'. Thus, the occupant can come to know that the turn signals 8*c*, 8*d* are turned on. Incidentally, no specific limitation is imposed on a mode in which to display the winker indicator 6*b* when the occupant manipulates the winker switch 5, or a mode in which to display the winker indicator 6*b* in the case where the surrounding condition detector 22 determines that the lane change is allowed (in the case where the host vehicle 60 starts the lane change, or in the case where the preparation for the lane change has been completed), as long as the occupant can distinguishably realize what condition the host vehicle 60 is in. In other words, the mode in which to display the winker indicator 6*b* is not necessarily limited to the above-explained ones: the mode in which the display controller 23 starts to keep the winker indicator 6*b* turned on when the occupant manipulates the winker switch 5; and the mode in which the display controller 23 blinks the winker indicator 6*b* when the surrounding condition detector 22 determines that the lane change is allowed.

Furthermore, in the embodiment, in a case where a result of the determination on whether the lane change (run control) is allowed is changed (from allowed to not allowed, or from not allowed to allowed), the display controller 23 changes the mode in which to display the winker indicator 6*b* to display the winker indicator 6*b* in a way that makes the progress in the turn signal preparation period and the expiration of the turn signal preparation period distinguishable from each other. This makes it possible for the occupant to realize the expiration of the turn signal preparation period at the timing at which the turn signal preparation period expires.

Next, descriptions will be provided for how to determine whether the lane change is allowed. The surrounding condition detector 22 determines that the lane change is not allowed, in a case where there is a vehicle which hinders the lane change. The surrounding condition detector 22 determines that the lane change is not allowed, for example in a case where a vehicle approaching the host vehicle 60 from behind is in a lane into which the host vehicle 60 is going by a lane-change maneuver (hereinafter referred to as an "adjacent lane"). That is to say, the surrounding condition detector 22 determines that the lane change is not allowed in the case where a vehicle approaching the host vehicle 60 from behind is in the adjacent lane. On the other hand, the surrounding condition detector 22 determines that the lane change is allowed and decides to perform the lane change control in a predetermined time, in a case where no other vehicle which hinders the lane change is around the host vehicle 60. That is to say, the surrounding condition detector 22 determines that the lane change is allowed, in the case where no other vehicle which hinders the lane change is around the host vehicle 60.

(2) Vehicle Control Preparation Period

Thereafter, at time T2 illustrated in FIG. 2B, in the case where the surrounding condition detector 22 determines that the lane change is allowed and the vehicle control ECU 31 performs the lane change control in a predetermined time, that is to say, a predetermined time (for example, three seconds) before the vehicle control ECU 31 starts the lane change control, the display controller 23 changes the lighting state of the winker indicator 6*b* from being continuously turned on to being blinked. In other words, in the case where the vehicle control ECU 31 performs the lane change in the predetermine time, the display controller 23 changes the lighting state of the winker indicator 6*b* from being continuously turned on to being blinked. In addition, the display controller 23 changes the lighting state of the turn signals 8*c*, 8*d* from being turned off to being blinked, corresponding to the lighting state of the winker indicator 6*b*. Furthermore, the display controller 23 changes the lighting state of the virtual turn signals 8*c*', 8*d*' from being continuously turned on to being blinked, corresponding to the lighting state of the turn signals 8*c*, 8*d*. By these, the display controller 23 is capable of informing the occupant that the lane change is going to be performed soon. Moreover, by blinking the turn signals 8*c*, 8*d*, the display controller 23 is capable of informing the other vehicles around the host vehicle 60 that the lane change is going to be performed in the predetermined time. Thereby, the display controller 23 is capable of informing the occupants of the other vehicles that the host vehicle 60 is going to perform the lane change, before the host vehicle 60 starts the lane change control. Thus, the other vehicles can inhibit behavior which makes the occupants of the other vehicles feel discomfort, such as increasing the inter-vehicle distance by deceleration in advance. Incidentally, the predetermined time is a time length from the turn signals 8*c*, 8*d* starting to blink to the start of the lane change control, and is not specifically limited. An example of the predetermined time is three seconds. In addition, in a case where the law or general rule sets forth a specific time length, the predetermined time may be set at the specific time length.

It should be noted that in the case where the surrounding condition detector 22 determines that the lane change is allowed, the display 7 may show that the vehicle control (automated lane change) is in preparation until the vehicle control ECU 31 actually performs the vehicle control. Thus, the occupant can know the run control is going to be performed from now although the run control has not been performed yet.

In addition, the display controller 23 makes the timing of starting to turn on the turn signals 8c, 8d, the timing of starting to turn on the winker indicator 6b, and the timing of staring to turn on the display for showing the preparation in the display 7 different from one another. This makes it possible for the occupant to know which lighting state the turn signals 8c, 8d is in, whether the turn signals 8c, 8d are going to turn on from now, and whether the vehicle control is going to be performed from now. The occupant can therefore know the condition of the host vehicle 60 exactly. Accordingly, the display controller 23 is capable of making the occupant less likely to feel discomfort while the occupant is riding the vehicle.

(3) Vehicle Control Performing Period

Thereafter, in the case where the vehicle control ECU 31 performs the lane change control, that is to say, in the case where the above-mentioned predetermined time elapses after the lane change preparation period starts, the display controller 23 keeps the winker indicator 6b turned on. In addition, the display controller 23 keeps the turn signals 8c, 8d turned on, corresponding to the lighting state of the winker indicator 6b. Furthermore, the display controller 23 keeps the virtual turn signals 8c', 8d' turned on, corresponding to the lighting state of the turn signals 8c, 8d. Thereby, the display controller 23 is capable of informing that the lane change is being performed. Moreover, by blinking the turn signals 8c, 8d, the display controller 23 is capable of informing the other vehicles around the host vehicle 60 that the host vehicle 60 is performing the lane change. Thereby, while the host vehicle 60 is performing the lane change control, the display controller 23 is capable of informing the occupants of the other vehicles that the host vehicle 60 is performing the lane change. Thus, the other vehicles can inhibit behavior which makes the occupants of the other vehicles feel discomfort, such as increasing the inter-vehicle distance by deceleration in advance. In addition, when the lane change to the adjacent lane has been completed, the display controller 23 turns off the winker indicator 6b, the turn signals 8c, 8d, and the virtual turn signal 8c', 8d' by terminating their lighting states.

Furthermore, the display 7 may show the vehicle control (automated lane change) is being performed. Thus, the occupant can know the vehicle control is being performed.

It should be noted that the display controller 23 may switch the mode (for example, the blinking cycle, as well as the intensity and color of the blinking light) in which to display the winker indicator 6b and the virtual turn signal 8c', 8d' between the vehicle control preparation period and the vehicle control performing period. Thus, the occupant can exactly know that the vehicle control is being performed. In addition, the switching of the mode in which to display the turn signals 8c, 8d by the display controller 23 also makes it possible for the occupants of the other vehicles to know that the vehicle control is being performed. Incidentally, the switching of the mode in which to display the winker indicator 6b, the turn signals 8c, 8d and the virtual turn signals 8c', 8d' between the vehicle control preparation period and the vehicle control performing period may be performed only while the host vehicle 60 is performing the automated driving. Thus, the occupant can exactly know that the vehicle control is being performed in the automated driving. In addition to this, the occupants of the other vehicles also can know that the host vehicle 60 is running differently from the usual run, for example, the host vehicle 60 is performing the automated driving, since the turn signals 8c, 8d blink in a different way.

As discussed above, when the system performs the lane change, the display controller 23 makes the timing of starting to turn on the turn signals 8c, 8d and the timing of starting to turn on the winker indicator 6b different from each other. Specifically, while the surrounding condition detector 22 is preparing the lane change, the display controller 23 keeps the winker indicator 6b turned on, but does not turn on the turn signals 8c, 8d. In other words, the display controller 23 turns on the winker indicator 6b before turning on the turn signals 8c, 8d.

Thereafter, in a case where the surrounding condition detector 22 determines that the preparation of the lane change has been completed, the display controller 23 changes the lighting state of the winker indicator 6b from being continuously turned on to being blinked. Furthermore, the display controller 23 changes the lighting state of the turn signals 8c, 8d from being turned off to being blinked, corresponding to the lighting state of the winker indicator 6b.

Because of the lighting control like this, the display controller 23 is capable of making the occupant less likely to feel discomfort while the occupant is riding the vehicle. That is to say, since the display controller 23 starts to keep the winker indicator 6b turned on when the occupant manipulates the winker switch 5, the occupant can know that the occupant's instruction is reflected, and can exactly know what condition the host vehicle 60 is in. Besides, once the turn signal preparation period has been completed, the display controller 23 blinks the winker indicator 6b and the turn signals 8c, 8d, and the occupant can accordingly know that the lane change is going to be performed soon.

The above-discussed example of how the system works is an example of how the system works to perform the lane change according to the single instruction from the occupant. In the automated driving, there is a case where the system performs the lane change according to two instructions from the occupant. Descriptions will be hereinbelow provided for an example of how the system works according to the two instructions from the occupant.

(1) Turn Signal Preparation Period

Let us assume that as illustrated in FIG. 2A, at time T1, the occupant detects the preceding vehicle 61, moving slower than the host vehicle 60, in front of the vehicle 60 in the same lane as the host vehicle 60 is moving.

In order to overtake the preceding vehicle 61, the occupant instructs a lane change by turning the winker switch 5 in the right direction. This instruction is referred to as a "first instruction." A period from the receipt of the first instruction to the display controller 23 starting to blink the turn signals 8c, 8d is referred to as a "turn signal preparation period." The turn signals 8c, 8d start to blink at the same timing as the surrounding condition detector 22 determines that the lane change is allowed. Otherwise, the timing of starting to blink the turn signals 8c, 8d may come after the surrounding condition detector 22 determines that the lane change is allowed, but before the host vehicle 60 starts the lane change, that is to say, the predetermined time (for example, 3 seconds) before the host vehicle 60 starts the lane change. Incidentally, the timing of starting to blink the turn signals 8c, 8d is not limited to these examples. The timing of starting to blink the turn signals 8c, 8d may be determined arbitrarily. At this time, the display controller 23 starts to keep the winker indicator 6b turned on, as illustrated in FIG. 2A. In addition, the display controller 23 starts to keep the virtual turn signals 8c', 8d' turned on. Thus, the occupant can know that the system has started a preparation for the lane change, and can exactly know the condition of the host vehicle 60. The above-discussed lighting method for the turn signal preparation period is the same as the lighting method employed in the case where the system performs the lane change according to the single instruction from the occupant.

(2) Vehicle Control Preparation Period

Thereafter, at time T2 illustrated in FIG. 2B, in the case where the surrounding condition detector 22 determines that the lane change is allowed in the predetermine time, that is to say, the predetermined time (for example, three seconds) before the vehicle control ECU 31 starts the lane change control, the system informs the occupant that the preparation for the lane change has been completed. For example, the system asks for a second instruction from the occupant by saying via a speaker, "The preparation for the lane change has been completed. Turn on the winker switch by turning it in the right direction." Since the occupant knows that the system starts the preparation for the lane change before receiving this notice, the occupant does not feel discomfort although receiving the notice. Upon receipt of the notice, the occupant turns on the winker switch 5. This is referred to as a "second instruction. Upon receipt of the second instruction, the display controller 23 changes the lighting state of the winker indicator 6b from being continuously turned on to being blinked. In addition, the display controller 23 changes the lighting state of the turn signals 8c, 8d from being turned off to being blinked, corresponding to the lighting state of the winker indicator 6b. Furthermore, the display controller 23 changes the lighting state of the virtual turn signals 8c', 8d' from being continuously turned on to being blinked, corresponding to the lighting state of the turn signals 8c, 8d. By these, the display controller 23 is capable of informing the occupant that the lane change is going to be performed soon. Moreover, by blinking the turn signals 8c, 8d, the display controller 23 is capable of informing the other vehicles around the host vehicle 60 that the lane change is going to be performed in the predetermined time. Thereby, the display controller 23 is capable of informing the occupants of the other vehicles that the host vehicle 60 is going to perform the lane change, before the host vehicle 60 starts the lane change control. Thus, the other vehicles can inhibit behavior which makes the occupants of the other vehicles feel discomfort, such as increasing the inter-vehicle distance by deceleration in advance. The above-discussed lighting method for the vehicle control preparation period is the same as the lighting method employed in the case where the system performs the lane change according to the single instruction from the occupant.

(3) Vehicle Control Performing Period

Thereafter, in the case where the vehicle control ECU 31 performs the lane change control, that is to say, in the case where the above-mentioned predetermined time elapses after the lane change preparation period starts, the display controller 23 keeps the winker indicator 6b turned on. In addition, the display controller 23 keeps the turn signals 8c, 8d turned on, corresponding to the lighting state of the winker indicator 6b. Furthermore, the display controller 23 keeps the virtual turn signals 8c', 8d' turned on, corresponding to the lighting state of the turn signals 8c, 8d. Thereby, the display controller 23 is capable of informing that the lane change is being performed. Moreover, by blinking the turn signals 8c, 8d, the display controller 23 is capable of informing the other vehicles around the host vehicle 60 that the host vehicle 60 is performing the lane change. Thereby, while the host vehicle 60 is performing the lane change control, the display controller 23 is capable of informing the occupants of the other vehicles that the host vehicle 60 is performing the lane change. The above-discussed lighting method for the vehicle control performing period is the same as the lighting method employed in the case where the system performs the lane change according to the single instruction from the occupant.

It should be noted that although the surrounding condition detector 22 checks the surrounding condition after the first instruction from the occupant, the checking of the surrounding condition is not limited to this timing. After the first instruction, the occupant may check the surrounding condition and issue the second instruction. Neither the first nor second instruction from the occupant is limited to that issued by the occupant's manipulation of the winker switch 5. The occupant may issue the first and second instructions by manipulating a different switch, or using a voice input system.

The above-discussed example of how the system works is an example of how the system works to perform the lane change according to one or two instructions from the occupant. In the automated driving, there is a case where the system performs the lane change based on the occupant's confirmation of the system's determination. Descriptions will be hereinbelow provided for an example of how the system works while asking for the occupant's confirmation. Incidentally, the occupant's confirmation is a kind of instruction.

(1) Turn Signal Preparation Period

Let us assume that as illustrated in FIG. 2A, at time T1, the surrounding condition detector 22 detects the preceding vehicle 61, moving slower than the host vehicle 60, in front of the vehicle 60 in the same lane as the host vehicle 60 is moving. The display controller 23 starts to keep the winker indicator 6b turned on to let the system inform the occupant that the lane change is allowed. The display controller 23 starts to keep the virtual turn signals 8c', 8d' turned on. Thus, the occupant can know that the system recognizes the condition allows the lane change, and can exactly know the condition of the host vehicle 60. The above-discussed lighting method for the turn signal preparation period is the same as the lighting method employed in the case where the system performs the lane change according to the single instruction from the occupant.

(2) Vehicle Control Preparation Period

Thereafter, at time T2 illustrated in FIG. 2B, in the case where the surrounding condition detector 22 determines that the lane change is allowed in the predetermine time, the system informs the occupant that the preparation for the lane change has been completed. For example, the system asks for the occupant's confirmation by saying via a speaker, "The preparation for the lane change has been completed. Turn on the winker switch by turning it in the right direction." Since before receiving this notice, the occupant knows that the system has started the preparation for the lane change, the occupant does not feel discomfort although receiving the notice. Once the occupant turns on the winker switch 5, the display controller 23 changes the lighting state of the winker indicator 6b from being continuously turned on to being blinked. In addition, the display controller 23 changes the lighting state of the turn signals 8c, 8d from being turned off to being blinked, corresponding to the lighting state of the winker indicator 6b. Furthermore, the display controller 23 changes the lighting state of the virtual turn signals 8c', 8d' from being continuously turned on to being blinked, corresponding to the lighting state of the turn signals 8c, 8d. By these, the display controller 23 is capable of informing the occupant that the lane change is going to be performed soon. Moreover, by blinking the turn signals 8c, 8d, the display controller 23 is capable of informing the other vehicles around the host vehicle 60 that the lane change is going to be performed in the predetermined time. Thereby, the display controller 23 is capable of informing the occupants of the other vehicles that the host vehicle 60 is going to perform the lane change, before the host vehicle 60 starts the lane change control. Thus, the other vehicles can inhibit behavior which makes the occupants of the other vehicles feel discomfort, such as increasing the inter-vehicle distance by deceleration in advance. Incidentally, the vehicle control preparation period may be defined as a period until the occupant turns on the winker switch 5, or a period until the vehicle control ECU 31 starts the vehicle control. The above-discussed lighting method for the vehicle control preparation period is the same as the lighting method employed in the case where the system performs the lane change according to the single instruction from the occupant.

(3) Vehicle Control Performing Period

Thereafter, in the case where the vehicle control ECU 31 performs the lane change control, that is to say, in the case where the above-mentioned predetermined time elapses after the lane change preparation period starts, the display controller 23 keeps the winker indicator 6b turned on. In addition, the display controller 23 keeps the turn signals 8c, 8d turned on, corresponding to the lighting state of the winker indicator 6b. Furthermore, the display controller 23 keeps the virtual turn signals 8c', 8d' turned on, corresponding to the lighting state of the turn signals 8c, 8d. By these, the display controller 23 is capable of informing that the lane change is being performed. Moreover, by blinking the turn signals 8c, 8d, the display controller 23 is capable of informing the other vehicles around the host vehicle 60 that the host vehicle 60 is performing the lane change. Thereby, while the host vehicle 60 is performing the lane change control, the display controller 23 is capable of informing the occupants of the other vehicles that the host vehicle 60 is performing the lane change. The above-discussed lighting method for the vehicle control performing period is the same as the lighting method employed in the case where the system performs the lane change according to the single instruction from the occupant.

Figure 3A:
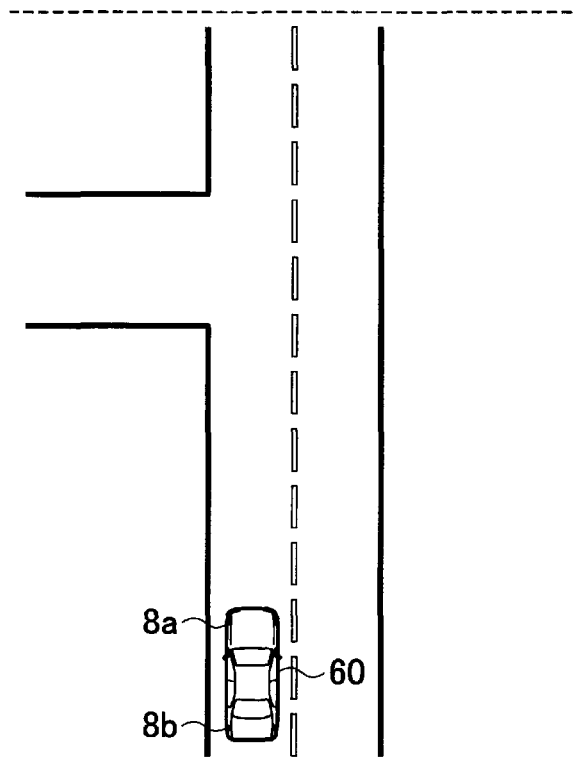
FIG. 3A is a diagram for explaining an example of how the display control device works for a left turn to be performed by the automated driving.
Figure 3A:
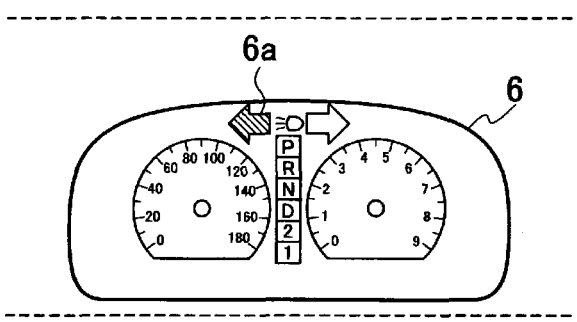
Figure 3A:
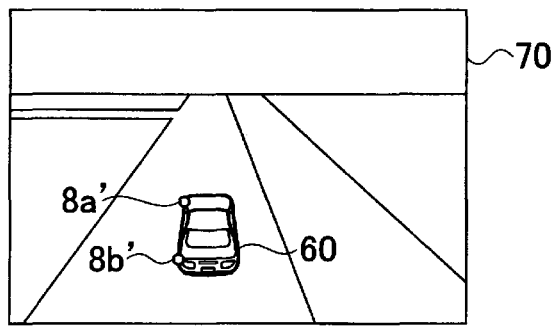
Figure 3B:
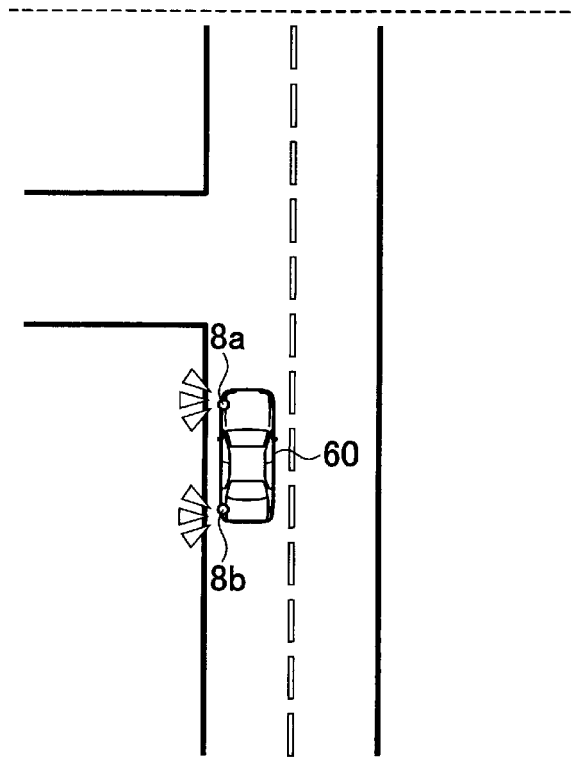
FIG. 3B is a diagram for explaining the example of how the display control device works for the left turn to be performed by the automated driving.
Figure 3B:
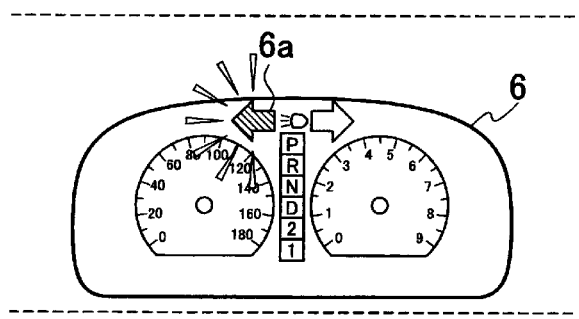
Figure 3B:
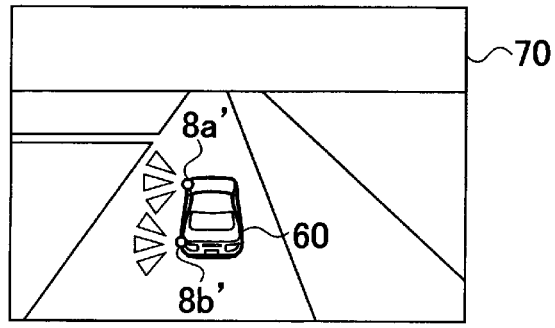

Next, referring to FIGS. 3A and 3B, descriptions will be provided for an example of how the display control device 100 works for a left turn to be performed by the automated driving. Incidentally, using FIG. 3A and the subsequent drawings, descriptions will be provided for an example of how the display control device 100 works while the automated driving is being performed according to a single instruction from the occupant. Descriptions for examples of how the display control device 100 works while the automated driving is being performed according to the occupant's two instructions and the occupant's confirmation will be omitted. It is a matter of course that the automated driving based on the occupant's two instructions and the occupant's confirmation is applicable to the example of how the display control device 100 works, which will be described using FIG. 3A and the subsequent drawings.

As illustrated in FIG. 3A, at time T1, in order to make a left turn at an intersection, the occupant instructs the left turn by turning the winker switch 5 in the left direction. Upon receipt of the occupant's instruction, the surrounding condition detector 22 starts a preparation for the left turn. For example, the surrounding condition detector 22 checks the condition of the surroundings of the host vehicle 60, and determines whether the left turn is allowed. When the surrounding condition detector 22 starts the preparation for the left turn, the display controller 23 starts to keep a winker indicator 6a turned on, as illustrated in FIG. 3A. In addition, the display controller 23 starts to keep virtual turn signals 8a', 8b' turned on. Thus, the occupant can recognize that the system has started the preparation for the left turn, and can exactly know the condition of the host vehicle 60. When the surrounding condition detector 22 starts the preparation for the left turn, the display controller 23 does not turn on a turn signal 8a, as illustrated in FIG. 3A. This is because the preparation for the left turn has not been completed yet.

Afterward, at time T2 illustrated in FIG. 3B, in a case where the surrounding condition detector 22 determines that the left turn is allowed in the predetermined time, the display controller 23 changes the lighting state of the winker indicator 6a from being continuously turned on to being blinked. In addition, the display controller 23 changes the lighting state of the turn signals 8a, 8b from being turned off to being blinked, corresponding to the lighting state of the winker indicator 6a. Furthermore, the display controller 23 changes the lighting state of the virtual turn signals 8a', 8b' from being continuously turned on to being blinked, corresponding to the lighting state of the turn signals 8a, 8b. By these, the display controller 23 is capable of informing the occupant that the preparation for the left turn has been completed and the left turn is going to be performed soon. Moreover, by blinking the turn signal 8a, 8b, the display controller 23 is capable of informing the other vehicles around the host vehicle 60 that the left turn is going to be performed in the predetermined time. Thereby, the display controller 23 is capable of informing the occupants of the other vehicles that the host vehicle 60 is going to perform the left turn, before the host vehicle 60 starts the left turn control. Thus, the other vehicles can inhibit behavior which makes the occupants of the other vehicles feel discomfort, such as increasing the inter-vehicle distance by deceleration in advance.

Although FIGS. 3A and 3B explains how the display control device 100 works for the left turn, the working of the display control device 100 is not limited to the left turn. The display control device 100 works for the right turn, as in the case of the left turn.

Figure 4A:
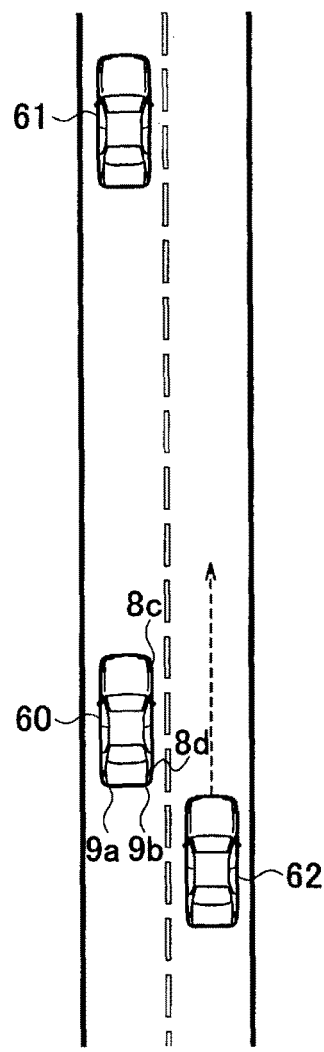
FIG. 4A is a diagram for explaining another example of how the display control device works for a lane change to be performed by the automated driving.
Figure 4A:
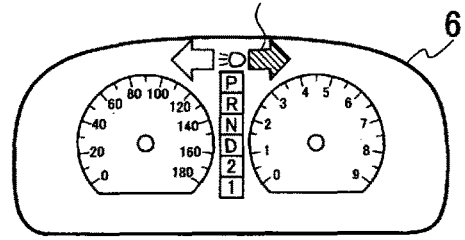
Figure 4A:
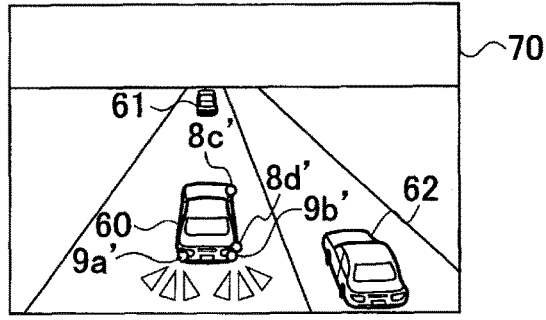
Figure 4B:
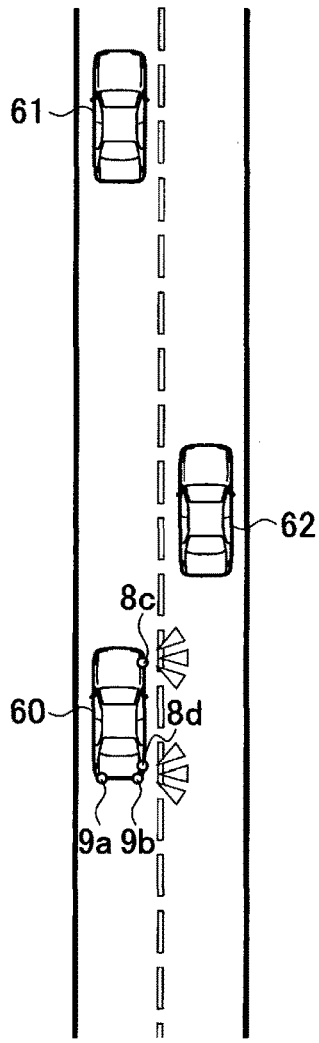
FIG. 4B is a diagram for explaining the example of how the display control device works for the lane change to be performed by the automated driving.
Figure 4B:
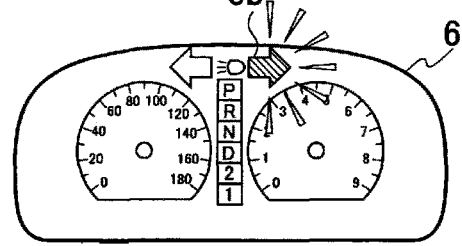
Figure 4B:
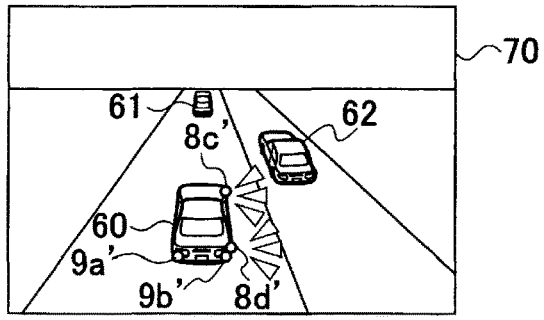

Next, referring to FIGS. 4A and 4B, descriptions will be provided for another example of how the display control device 100 works for a lane change to be performed by the automated driving. What makes the FIGS. 4A and 4B different from FIGS. 2A and 2B is that there is a follow-on vehicle 62 in FIGS. 4A and 4B. Virtual brake lamps 9a', 9b' (brake indicators) illustrated in FIG. 4A represent virtual brake lamps in the surrounding image 70, and are different from actual brake lamps 9a, 9b.

Let us assume that as illustrated in FIG. 4A, at time T1, the occupant detects the preceding vehicle 61, moving slower than the host vehicle 60, in front of the vehicle 60 in the same lane as the host vehicle 60 is moving.

(1) Turn Signal Preparation Period

In order to overtake the preceding vehicle 61, the occupant instructs a lane change by turning the winker switch 5 in the right direction. Upon receipt of the occupant's instruction, the surrounding condition detector 22 checks the condition of the surroundings of the host vehicle 60, and determines whether the lane change is allowed. At this time, the display controller 23 starts to keep the winker indicator 6b turned on, as illustrated in FIG. 4A. In addition, the display controller 23 starts to keep the virtual turn signals 8c', 8d' turned on in the display 7. Thus, the occupant can recognize that the system has started the preparation for the lane change, and can exactly know the condition of the host vehicle 60.

When the surrounding condition detector 22 starts the preparation for the lane change, the display controller 23 does not turn on the turn signals 8*c*, 8*d*, as illustrated in FIG. 4A. The reason for this is that the surrounding condition detector 22 checks the condition of the surroundings of the host vehicle 60 and determines that the condition is not suitable for the lane change.

As illustrated in FIG. 4A, at time T1, the surrounding condition detector 22 determines that the lane change is not allowed since the follow-on vehicle 62 is in the adjacent lane. The system, therefore, examines whether to operate the brake for the purpose of making the follow-on vehicle 62 away from the host vehicle 60. The surrounding condition detector 22 checks the condition of the surroundings of the host vehicle 60 to determine whether deceleration is allowed. In a scene illustrated in FIG. 4A, the surrounding condition detector 22, for example, detects the condition of the preceding vehicle 61 to determine whether the deceleration is allowed. At time T1, if the system would start the deceleration immediately after the surrounding condition detector 22 determines that the deceleration is allowed, the occupant would feel discomfort. The display controller 23, therefore, blinks the virtual brake lamps 9*a*', 9*b*' before the system starts to operate the brake, as illustrated in FIG. 4A. Thereby, before the system operates the brake, the display controller 23 is capable of informing the occupant that the brake is going to work. This makes the occupant less likely to feel discomfort, even if the brake actually works. Incidentally, the reason why the display controller 23 blinks the virtual brake lamps 9*a*', 9*b*' is that the occupant would feel discomfort if the display controller 23 would start to keep the virtual brake lamps 9*a*', 9*b*' turned on. While the brake is in operation, the brake lamps 9*a*, 9*b* are usually kept turned on. If, therefore, the virtual brake lamps 9*a*', 9*b*' would be kept turned on while the brake is out of operation, the occupant would feel discomfort. With this taken into consideration, the display controller 23 blinks the virtual brake lamps 9*a*', 9*b*' so as to make the occupant less likely feel this discomfort.

(2) Vehicle Control Preparation Period

Let us assume that thereafter, at time T2 illustrated in FIG. 4B, the system operates the brake and the follow-on vehicle 62 goes away from the host vehicle 60. At time T2, since system is operating the brake, the brake lamps 9*a*, 9*b* are kept turned on. The display controller 23 changes the lighting state of the virtual brake lamps 9*a*', 9*b*' from being blinked to being kept turned on, corresponding to the light condition of the brake lamps 9*a*, 9*b*.

In addition, at time T2 illustrated in FIG. 4B, in the case where the surrounding condition detector 22 determines that the lane change is allowed and the vehicle control ECU 31 is going to perform the lane change control in the predetermined time, that is to say, the predetermined time (for example, three seconds) before the vehicle control ECU 31 starts the lane change control, the display controller 23 changes the lighting state of the winker indicator 6*b* from being continuously turned on to being blinked. In addition, the display controller 23 changes the lighting state of the turn signals 8*c*, 8*d* from being turned off to being blinked, corresponding to the lighting state of the winker indicator 6*b*. Furthermore, the display controller 23 changes the lighting state of the virtual turn signals 8*c*', 8*d*' from being continuously turned on to being blinked, corresponding to the lighting state of the turn signals 8*c*, 8*d*. By these, the display controller 23 is capable of informing the occupant that the preparation for the lane change has been completed and the lane change is going to be performed soon. Moreover, by blinking the turn signals 8*c*, 8*d*, the display controller 23 is capable of informing the other vehicles around the host vehicle 60 that the lane change is going to be performed in the predetermined time. Thereby, the display controller 23 is capable of informing the occupants of the other vehicles that the host vehicle 60 is going to perform the lane change, before the host vehicle 60 starts the lane change control. Thus, the other vehicles can inhibit behavior which makes the occupants of the other vehicles feel discomfort, such as increasing the inter-vehicle distance by deceleration in advance.

(3) Vehicle Control Performing Period

Thereafter, in the case where the vehicle control ECU 31 performs the lane change control, that is to say, in the case where the above-mentioned predetermined time elapses after the lane change preparation period starts, the display controller 23 keeps the winker indicator 6*b* turned on. In addition, the display controller 23 keeps the turn signals 8*c*, 8*d* turned on, corresponding to the lighting state of the winker indicator 6*b*. Furthermore, the display controller 23 keeps the virtual turn signals 8*c*', 8*d*' turned on, corresponding to the lighting state of the turn signals 8*c*, 8*d*. By these, the display controller 23 is capable of informing that the lane change is being performed. Moreover, by blinking the turn signals 8*c*, 8*d*, the display controller 23 is capable of informing the other vehicles around the host vehicle 60 that the host vehicle 60 is performing the lane change. Thereby, while the host vehicle 60 is performing the lane change control, the display controller 23 is capable of informing the occupants of the other vehicles that the host vehicle 60 is performing the lane change. Thus, the other vehicles can inhibit behavior which makes the occupants of the other vehicles feel discomfort, such as increasing the inter-vehicle distance by deceleration in advance. In addition, when the lane change to the adjacent lane has been completed, the display controller 23 turns off the winker indicator 6*b*, the turn signals 8*c*, 8*d*, and the virtual turn signal 8*c*', 8*d*' by terminating their lighting states.

Figure 5A:
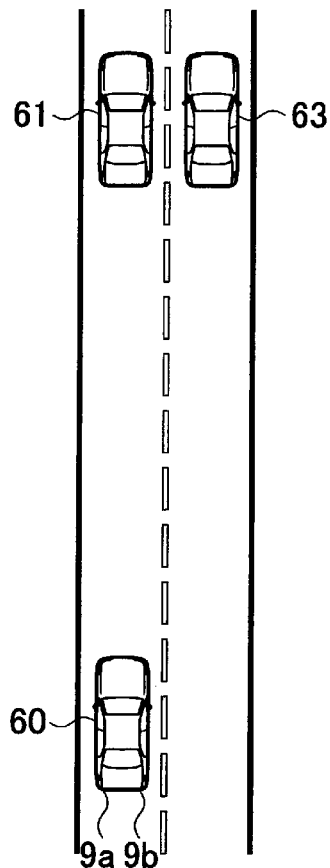
FIG. 5A is a diagram for explaining an example of how the display control device 100 works for deceleration to be performed by the automated driving.
Figure 5A:
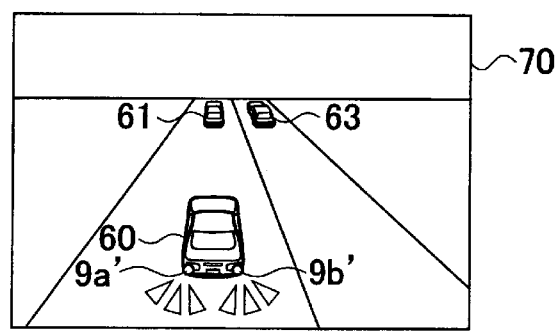
Figure 5B:
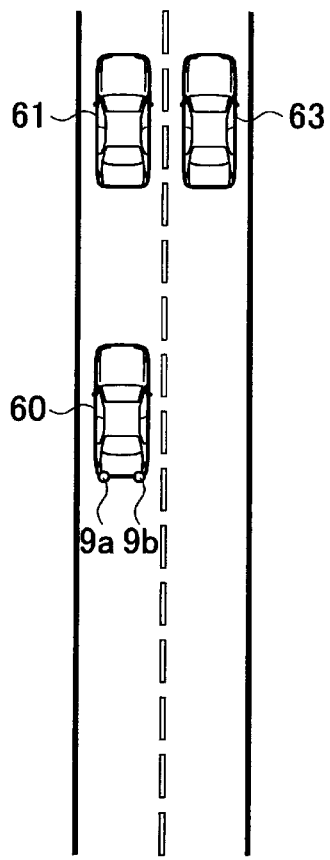
FIG. 5B is a diagram for explaining the example of how the display control device 100 works for the deceleration to be performed by the automated driving.
Figure 5B:
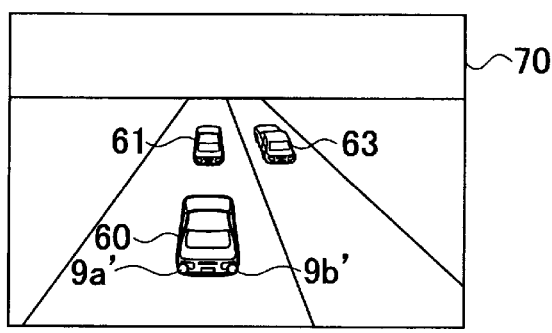

Next, referring to FIGS. 5A and 5B, descriptions will be provided for an example of how the display control device 100 works for deceleration to be performed by the automated driving.

Let us assume that as illustrated in FIG. 5A, at time T1, the occupant detects preceding vehicles 61, 63 in front of the host vehicle 60, respectively in the same lane as the host vehicle 60 is running, and in the adjacent lane.

(1) Turn Signal Preparation Period

Because a lane change does not change the situation, the occupant instructs deceleration in order to secure the inter-vehicle distance to the preceding vehicle 61. This deceleration instruction is carried out by the occupant's manipulation of, for example, a deceleration switch installed in the vehicle compartment. Upon receipt of the occupant's instruction, the surrounding condition detector 22 starts a preparation for the deceleration. For example, the surrounding condition detector 22 checks the condition of the surroundings of the host vehicle 60, and determines whether the deceleration is allowed. In a scene illustrated in FIG. 5A, the surrounding condition detector 22 detects the condition of the preceding vehicle 61, and determines whether the deceleration is allowed.

(2) Vehicle Control Preparation Period

At time T1, if the system would start the deceleration immediately after the surrounding condition detector 22 determines that the deceleration is allowed, the occupant would feel discomfort. The display controller 23, therefore, blinks the virtual brake lamps 9a', 9b' before the system starts to operate the brake, as illustrated in FIG. 5A. Thereby, before the system operates the brake, the display controller 23 is capable of informing the occupant that the brake is going to work. This makes the occupant less likely to feel discomfort, even if the brake actually works.

(3) Vehicle Control Performing Period

Thereafter, at time T2 illustrated in FIG. 5B, since the system is operating the brake, the brake lamps 9a, 9b are kept turned on. The display controller 23 changes the lighting state of the virtual brake lamps 9a', 9b' from being blinked to being continuously turned on, corresponding to the lighting state of the brake lamps 9a, 9b. Thereby, the display controller 23 is capable of informing the other vehicles around the host vehicle 60 that the host vehicle 60 is decelerating.

Figure 6A:
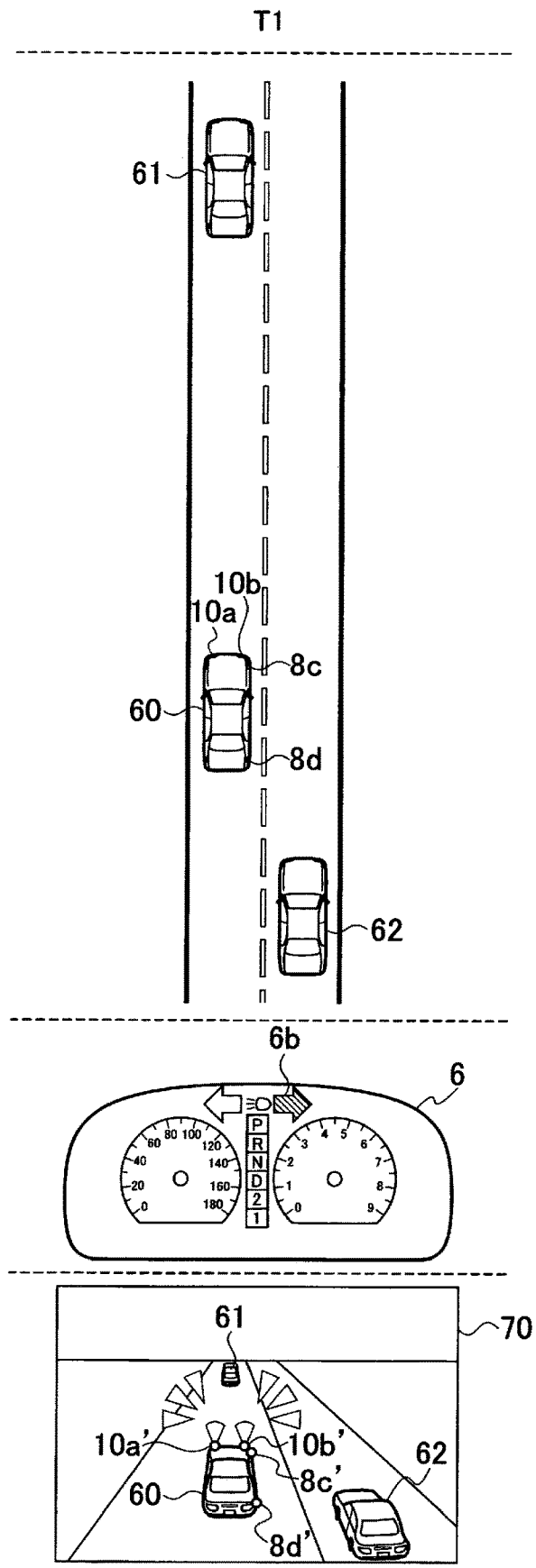
FIG. 6A is a diagram for explaining yet another example of how the display control device works for a lane change to be performed by the automated driving.
Figure 6B:
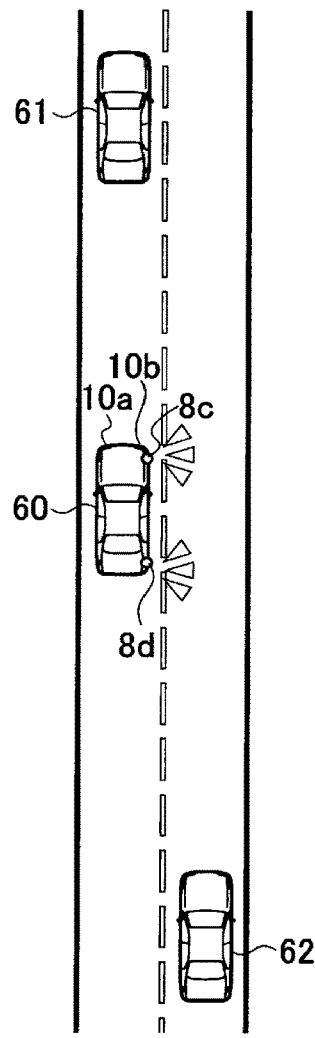
FIG. 6B is a diagram for explaining the example of how the display control device works for the lane change to be performed by the automated driving.
Figure 6B:
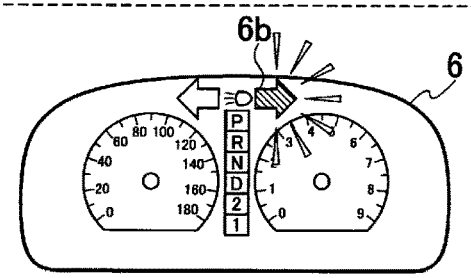
Figure 6B:
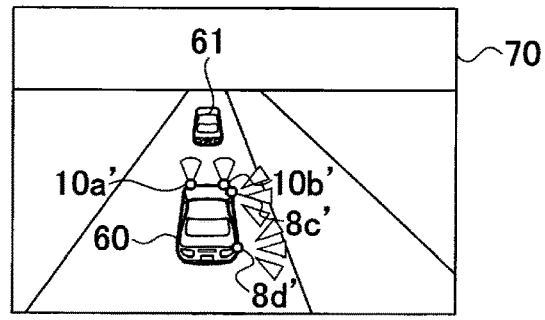

Next, referring to FIGS. 6A and 6B, descriptions will be provided for another example of how the display control device 100 works for a lane change to be performed by the automated driving. What makes FIGS. 6A and 6B different from FIGS. 2A and 2B is that there is the follow-on vehicle 62 in FIGS. 6A and 6B. Virtual head lamps 10a', 10b' illustrated in FIG. 6A represent virtual head lamps in the surrounding image 70, and are different from actual head lamps 10a, 10b.

Let us assume that as illustrated in FIG. 6A, at time T1, the occupant detects the preceding vehicle 61, moving slower than the host vehicle 60, in front of the vehicle 60 in the same lane as the host vehicle 60 is moving.

(1) Turn Signal Preparation Period

In order to overtake the preceding vehicle 61, the occupant instructs a lane change by turning the winker switch 5 in the right direction. Upon receipt of the occupant's instruction, the surrounding condition detector 22 checks the condition of the surroundings of the host vehicle 60, and determines whether the lane change is allowed. At this time, the display controller 23 starts to keep the winker indicator 6b turned on, as illustrated in FIG. 6A. In addition, the display controller 23 starts to keep the virtual turn signals 8c', 8d' turned on. Thus, the occupant can recognize that the system has started the preparation for the lane change, and can exactly know the condition of the host vehicle 60.

When the surrounding condition detector 22 starts the preparation for the lane change, the display controller 23 dose not turn on the turn signals 8c, 8d, as illustrated in FIG. 6A. The reason for this is that the surrounding condition detector 22 checks the condition of the surroundings of the host vehicle 60 and determined that the condition is not suitable for the lane change.

As illustrated in FIG. 6A, at time T1, the surrounding condition detector 22 determines that the lane change is not allowed since the follow-on vehicle 62 is in the adjacent lane. The system, therefore, examines whether to accelerate the host vehicle 60 for the purpose of making the follow-on vehicle 62 away from the host vehicle 60. The surrounding condition detector 22 checks the condition of the surroundings of the host vehicle 60 to determine whether the acceleration is allowed. In a scene illustrated in FIG. 6A, the surrounding condition detector 22 detects the condition of the preceding vehicle 61 to determine whether the acceleration is allowed. At time T1, if the system would start the acceleration immediately after the surrounding condition detector 22 determines that the acceleration is allowed, the occupant would feel discomfort. The display controller 23, therefore, blinks the virtual head lamps 10a', 10b' before the system starts the acceleration, as illustrated in FIG. 6A. Thereby, before the system starts the acceleration, the display controller 23 is capable of informing the occupant that the system is going to start the acceleration. This makes the occupant less likely to feel discomfort, even if the system actually starts the acceleration. Incidentally, as illustrated in FIG. 6A, the display controller 23 blinks the virtual head lamps 10a', 10b', but does not turn on the actual head lamps 10a, 10b.

(2) Vehicle Control Preparation Period

Let us assume that thereafter, at time T2 illustrated in FIG. 6B, the system accelerates the host vehicle 60 and the follow-on vehicle 62 goes away from the host vehicle 60. At time T2, since system is accelerating the host vehicle 60, the display controller 23 changes the lighting state of the virtual head lamps 10a', 10b' from being blinked to being continuously turned on. Thereby, the display controller 23 is capable of informing the occupant that the host vehicle 60 is accelerating.

At time T2, in the case where the surrounding condition detector 22 determines that the lane change is allowed and the vehicle control ECU 31 is going to perform the lane change control in the predetermined time, that is to say, the predetermined time (for example, three seconds) before the vehicle control ECU 31 starts the lane change control, the display controller 23 changes the lighting state of the winker indicator 6b from being continuously turned on to being blinked. In addition, the display controller 23 changes the lighting state of the turn signals 8c, 8d from being turned off to being blinked, corresponding to the lighting state of the winker indicator 6b. Furthermore, the display controller 23 changes the lighting state of the virtual turn signals 8c', 8d' from being continuously turned on to being blinked, corresponding to the lighting state of the turn signals 8c, 8d. By these, the display controller 23 is capable of informing the occupant that the preparation for the lane change has been completed and the lane change is going to be performed soon. Moreover, by blinking the turn signals 8c, 8d, the display controller 23 is capable of informing the other vehicles around the host vehicle 60 that the host vehicle 60 is going to perform the lane change in the predetermined time. Thereby, the display controller 23 is capable of informing the occupants of the other vehicles that the host vehicle 60 is going to perform the lane change, before the host vehicle 60 starts the lane change control. Thus, the other vehicles can inhibit behavior which makes the occupants of the other vehicles feel discomfort, such as increasing the inter-vehicle distance by deceleration in advance.

(3) Vehicle Control Performing Period

Thereafter, in the case where the vehicle control ECU 31 performs the lane change control, that is to say, in the case where the above-mentioned predetermined time elapses after the lane change preparation period starts, the display controller 23 keeps the winker indicator 6b turned on. In addition, the display controller 23 keeps the turn signals 8c, 8d turned on, corresponding to the lighting state of the winker indicator 6b. Furthermore, the display controller 23 keeps the virtual turn signals 8c', 8d' turned on, corresponding to the lighting state of the turn signals 8c, 8d. By these, the display controller 23 is capable of informing that the lane change is being performed. Moreover, by blinking the turn signals 8c, 8d, the display controller 23 is capable of informing the other vehicles around the host vehicle 60 that the host vehicle 60 is performing the lane change. Thereby, while the host vehicle 60 is performing the lane change control, the display controller 23 is capable of informing the occupants of the other vehicles that the host vehicle 60 is performing the lane change. Thus, the other vehicles can inhibit behavior which makes the occupants of the other vehicles feel discomfort, such as increasing the inter-vehicle distance by deceleration in advance. In addition, when the lane change to the adjacent lane has been completed, the display controller 23 turns off the winker indicator 6b, the turn signals 8c, 8d, and the virtual turn signal 8c', 8d' by terminating their lighting states.

Figure 7A:
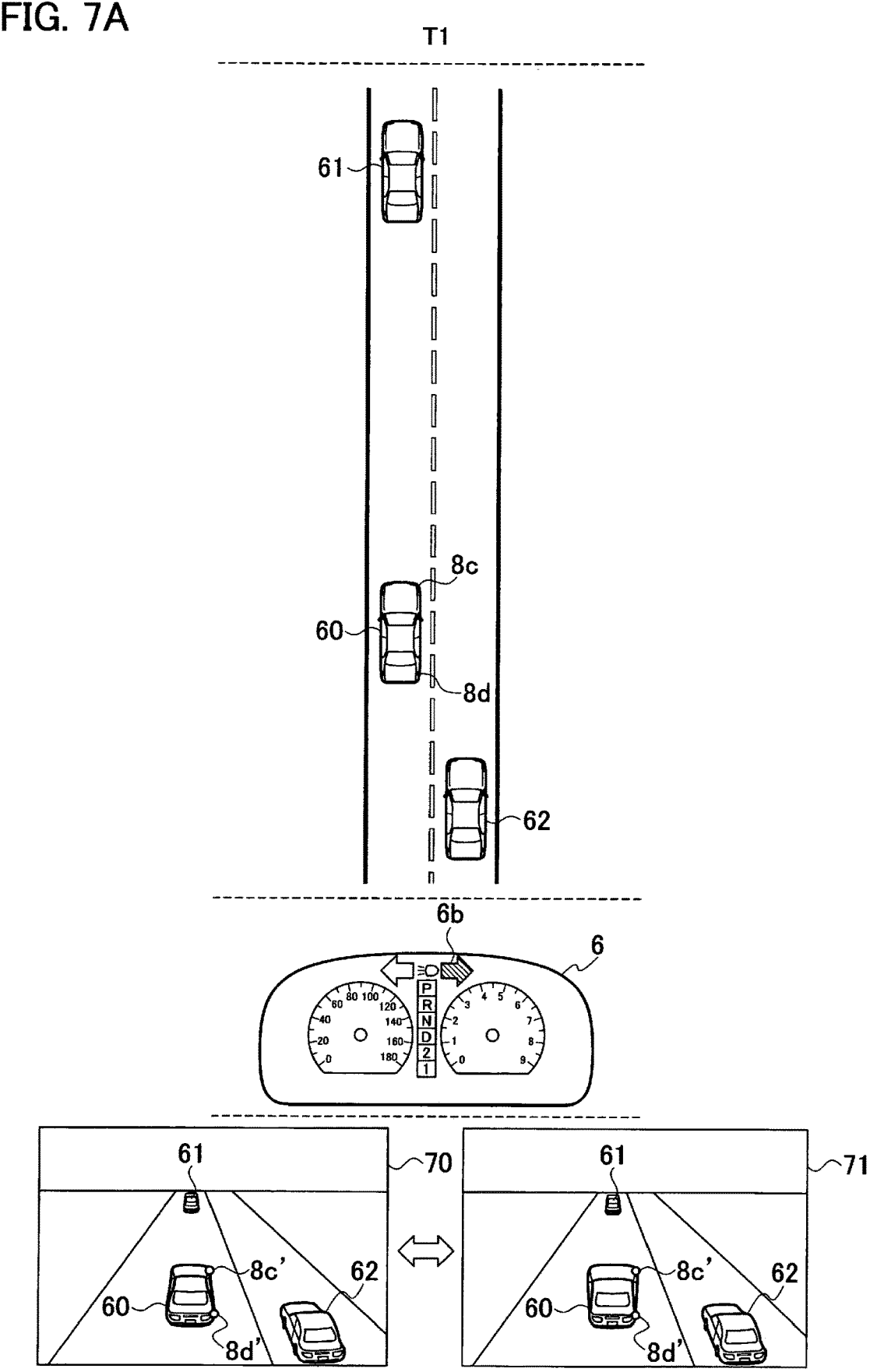
FIG. 7A is a diagram for explaining still another example of how the display control device works for a lane change to be performed by the automated driving.
Figure 7B:
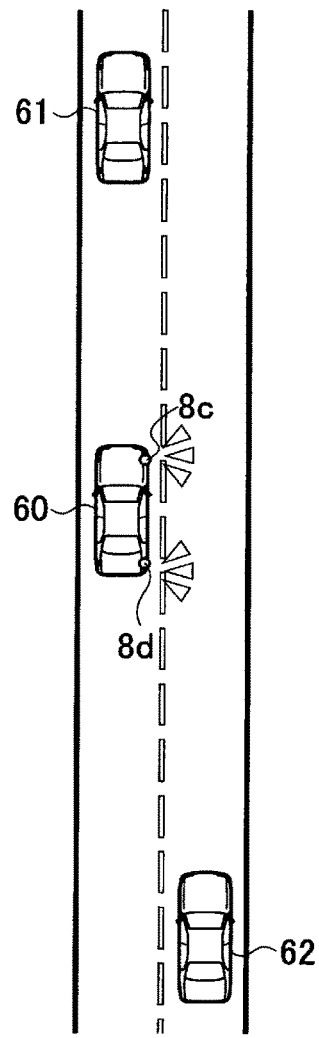
FIG. 7B is a diagram for explaining the example of how the display control device works for the lane change to be performed by the automated driving.
Figure 7B:
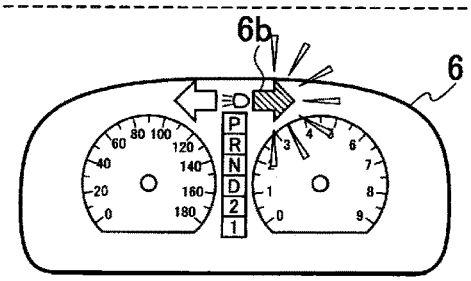
Figure 7B:
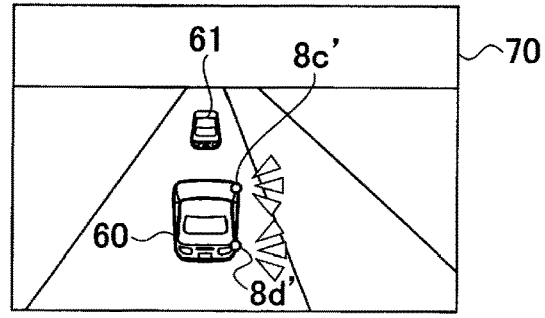

Although FIGS. 6A and 6B illustrate that the display controller 23 controls the lighting state of the virtual head lamps 10a', 10b' so as to beforehand inform the occupant that the system is going to accelerate the host vehicle 60, the method of informing the occupant that the system is going to accelerate the host vehicle 60 is not limited to the control of the lighting state of the virtual head lamps 10a', 10b'. For example, as illustrated by surrounding images 70, 71 in FIG. 7A, the display controller 23 may display the host vehicle 60 as if the host vehicle 60 repeatedly performed wheelies. Thereby, before the system starts the acceleration, the display controller 23 is capable of informing the occupant that the system is going to start the acceleration. Otherwise, as illustrated in FIG. 7B, while the system is accelerating the host vehicle 60, the display controller 23 may display the host vehicle 60 in the surrounding image 70 as if the host vehicle 60 continued performing wheelie.

Figure 8A:
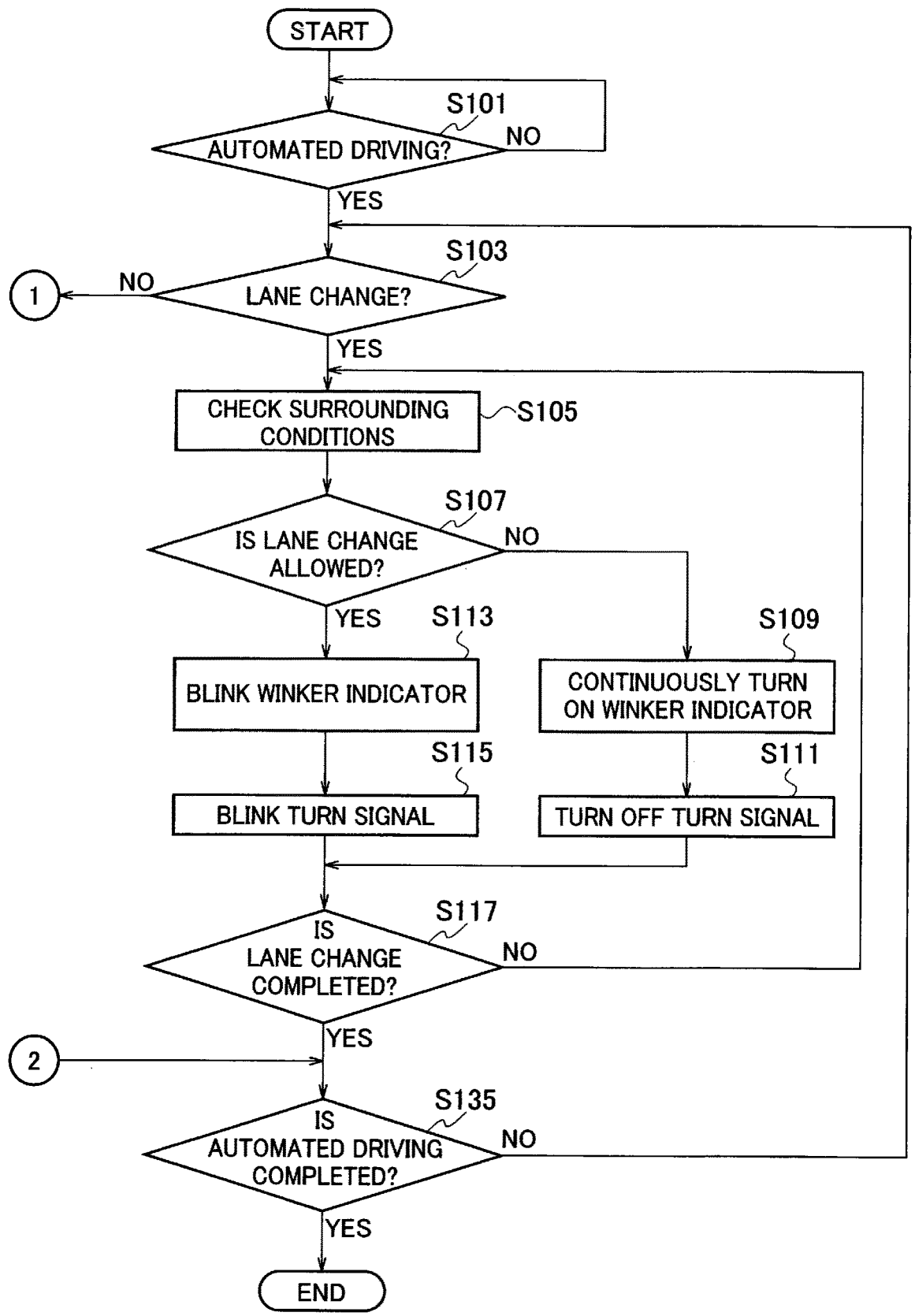
FIG. 8A is a flowchart for explaining an example of how the display control device according to the embodiment of the present invention works.
Figure 8B:
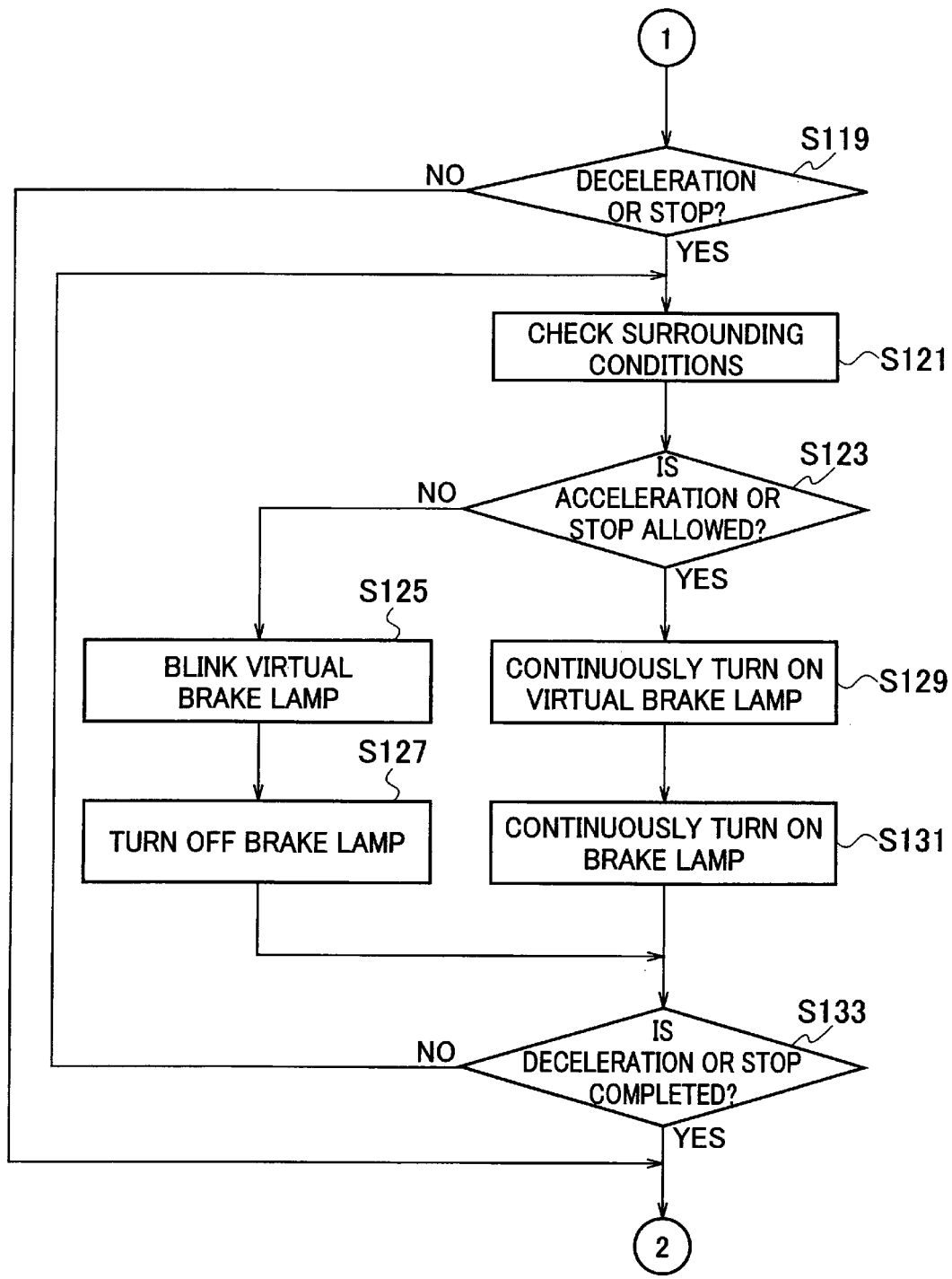
FIG. 8B is a flowchart for explaining the example of how the display control device according to the embodiment of the present invention works.

Next, referring to flowcharts in FIGS. 8A and 8B, descriptions will be provided for an example of how the display control device 100 according to the embodiment works.

In step S101, the display control device 100 determines whether the host vehicle 60 is performing the automated driving. For example, in a case where a drive switch installed in the host vehicle 60 is on, the display control device 100 determines that the host vehicle 60 is performing the automated driving. On the other hand, in a case where the drive switch is off, the display control device 100 determines that the host vehicle 60 is not performing the automated driving. If the host vehicle 60 is performing the automated driving (if Yes in step S101), the process proceeds to step S103. On the other hand, If the host vehicle 60 is not performing the automated driving (if No in step S101), the process stands by.

In step S103, if an instruction for the lane change comes from the occupant (if Yes in step S103), the process proceeds to step S105. On the other hand, if no instruction for the lane change comes from the occupant (if No in step S103), the proceeds to step S119. In step S105, the surrounding condition detector 22 starts the preparation for the lane change. The surrounding condition detector 22 checks the condition of the surroundings of the host vehicle 60, and determines whether the lane change is allowed. Once the surrounding condition detector 22 starts the preparation for the lane change, the display controller 23 starts to keep the winker indicator 6b turned on, as illustrated in FIG. 2A. In addition, the display controller 23 starts to keep the virtual turn signals 8c', 8d' turned on. Thus, the occupant can recognize that the system has started the preparation for the lane change, and can exactly know the condition of the host vehicle 60. If the lane change is not allowed (if No in step S107), the process proceeds to steps S109 and S111, where the display controller 23 starts to keep the winker indicator 6b turned on without turning on the turn signals 8c, 8d, as illustrated in FIG. 2A. Thereafter, the process proceeds to step S117. On the other hand, if the lane change is allowed in the predetermined time (if Yes in step S107), the process proceeds to steps S113 and S115, where the display controller 23 changes the lighting state of the winker indicator 6b from being continuously turned on to being blinked, as illustrated in FIG. 2B. Furthermore, the display controller 23 changes the lighting state of the turn signals 8c, 8d from being turned off to being blinked, corresponding to the lighting state of the winker indicator 6b. By these, the display controller 23 is capable of informing the occupant that the preparation of the lane change has been completed and the lane change is going to be performed soon. Moreover, by blinking the turn signals 8c, 8d, the display controller 23 is capable of informing the other vehicles around the host vehicle 60 that the lane change is going to be performed in the predetermined time. Thereby, before the host vehicle 60 starts the lane change control, the display controller 23 is capable of informing the occupants of the other vehicles that the host vehicle 60 is going to perform the lane change. Thus, the other vehicles can inhibit behavior which makes the occupants of the other vehicles feel discomfort, such as increasing the inter-vehicle distance by deceleration in advance. Thereafter, the process proceeds to step S117.

In step S117, the vehicle control ECU 31 determines whether the lane change has been completed. The standard for determining whether the lane change has been completed may be set arbitrarily. For example, the vehicle control ECU 31 may determine that the lane change has been completed, when the host vehicle 60 runs over the white line (passage line). Alternatively, the vehicle control ECU 31 may determine that the lane change has been completed, when 80% of the vehicle body enters the adjacent lane. Otherwise, the vehicle control ECU 31 may determine that the lane change has been completed, when the vehicle body fully enters the adjacent lane. If the lane change has been completed (if Yes in step S117), the process proceeds to step S135, where the display controller 23 turns off the winker indicator 6b, and the turn signals 8c, 8d. On the other hand, if the lane change has not been completed yet (if No in step S117), the process returns to step S105.

In step S119, if an instruction for the deceleration or stop comes from the occupant (if Yes in step S119), the process proceeds to step S121. On the other hand, if no instruction for the deceleration or stop comes from the occupant (if No in step S119), the process proceeds to step S135. In step S121, the surrounding condition detector 22 starts the preparation for the deceleration or stop. The surrounding condition detector 22 checks the condition of the surroundings of the host vehicle 60, and determines whether the deceleration or stop is allowed. When the surrounding condition detector 22 starts the preparation for the deceleration or stop, the display controller 23 blinks the virtual brake lamps 9a', 9b', as illustrated in FIG. 5A. Thereby, before the system starts to operate the brake, the display controller 23 is capable of informing the occupant that the brake is going to work. This makes the occupant less likely to feel discomfort, even if the brake actually works.

If the deceleration or stop is not allowed (if No in step S123), the process proceeds to steps S125 and S127, where the display controller 23 blinks the virtual brake lamps 9a', 9b' but does not turn on the brake lamps 9a, 9b, as illustrated in FIG. 5A. Thereafter, the process proceeds to step S133.

On the other hand, if the deceleration or stop is allowed (if Yes in step S123), the system operates the brake. The process proceeds to steps S129 and S131, where the display controller 23 starts to keep the brake lamps 9a, 9b turned on, as illustrated in FIG. 5B. In addition, the display controller 23 changes the lighting state of the virtual brake lamps 9a', 9b' from being blinked to being continuously turned on, corresponding to the lighting state of the brake lamps 9a, 9b. Thereafter, the process proceeds to step S133.

If the deceleration or stop has been completed (if Yes in steps S113), the process proceeds to step S135. On the other hand, if the deceleration or stop has not been completed yet (if No in steps S113), the process returns to step S121. If the automated driving has been completed (if Yes in step S135), the series of steps comes to an end. On the other hand, if the automated driving has not been completed yet (if No in step S135), the process returns to step S103.

(Working and Effects)

As discussed above, the display control device 100 according to the embodiment obtains the following working and effects.

When the system performs the lane change, or the right or left turn, the display control device 100 makes the timing of starting to turn on the turn signal 8 and the timing of starting to turn on the winker indicator different from each other. Thus, the occupant can exactly know the condition of the host vehicle 60. Accordingly, the display control device 100 is capable of making the occupant less likely to feel discomfort while the occupant is riding the vehicle.

In addition, the display control device 100 turns on the winker indicator before turning on the turn signal 8. For example, as illustrated in FIG. 2A, in the case where the surrounding condition detector 22 checks the condition of the surroundings of the host vehicle 60 and determines whether the lane change is allowed, the display controller 23 starts to keep the winker indicator 6b turned on, but does not turn on the turn signals 8c, 8d. In other words, the display controller 23 turns on the winker indicator 6b before turning on the turn signals 8c, 8d. Thereby, the display controller 23 is capable of showing the occupant that the turn signals 8c, 8d are in preparation to be turned on (going to be turned on) for the lane change, although the turn signals 8c, 8d have not been turned on yet. Thus, the occupant can exactly know the condition of the host vehicle 60.

The timing of starting to turn on the winker indicator and the timing of the change from the lane change preparation to the start of the lane change control are different from each other. In the embodiment, the timing of starting to turn on the winker indicator is a time for which the lane change is being prepared, but not time at which the lane change control is started. Although the winker indicator starts to turn on when the occupant manipulates the winker switch 5, the timing at which the winker indicator starts to turn on is not necessarily appropriate as the timing at which the turn signal 8 turns on. For example, in the case where the occupant instructs the overtaking of the preceding vehicle with a lane change during the automated driving, there is a case where the system is incapable of performing the lane change immediately after the instruction. In this case, the system has to start to perform the lane change control only after finding suitable timing (such as time at which other vehicles disappear from around the host vehicle). The turn signal 8 needs to start to turn on at the timing at which the system starts to perform the lane change control. In a case where the turn signal 8 starts to turn on at the timing at which the occupant manipulates the winker switch 5, the turning on may adversely affect the run of the other vehicles around the host vehicle because the start of the turning on is too early. For example, it is considered that when the turn signal 8 turns on, other vehicles around the host vehicle 60 detect this turning on and apply a sudden brake so as to increase the inter-vehicle distance to the host vehicle 60. Such a sudden brake may make the occupants of the other vehicles feel discomfort.

In the embodiment, therefore, upon receipt of the first instruction from the occupant, the surrounding condition detector 22 starts the preparation for the lane change. At this time, the display controller 23 starts to keep the winker indicator 6b turned on, as illustrated in FIG. 2A. Thus, the occupant can recognize that the system has started the preparation for the lane change, and can exactly know the condition of the host vehicle 60. Thereafter, in the case where the occupant or the system checks the condition of the surrounding of the host vehicle 60 and determines that the lane change is allowed, the occupant issues the second instruction. Upon receipt of the second instruction, the display controller 23 changes the lighting state of the winker indicator 6b from being continuously turned on to being blinked. In addition, the display controller 23 changes the lighting state of the turn signals 8c, 8d from being turned off to being blinked, corresponding to the lighting state of the winker indicator 6b. Thereby, the display controller 23 is capable of informing the occupant that the lane change is going to be performed soon. Furthermore, by blinking the turn signals 8c, 8d, the display controller 23 is capable of informing the other vehicles around the host vehicle 60 that the lane change is going to be performed in the predetermined time. Thereby, before the host vehicle 60 starts the lane change control, the display controller 23 is capable of informing the occupants of the other vehicles that the host vehicle 60 is going to perform the lane change. Thus, the other vehicles can inhibit behavior which makes the occupants of the other vehicles feel discomfort, such as increasing the inter-vehicle distance by deceleration in advance.

In addition, before the occupant's instruction, the display controller 23 may start to keep the winker indicator 6b turned on, as illustrated in FIG. 2A. Thus, the occupant can recognize that the system has started the preparation for the lane change, and can exactly know the condition of the host vehicle 60. Thereafter, when the preparation for the lane change has been completed, the display controller 23, upon receipt of the occupant's instruction, changes the lighting state of the winker indicator 6b from being continuously turned on to being blinked. In addition, the display controller 23 changes the lighting state of the turn signals 8c, 8d from being turned off to being blinked, corresponding to the lighting state of the winker indicator 6b. Thereby, the display controller 23 is capable of informing the occupant that the lane change is going to be performed soon. Furthermore, by blinking the turn signals 8c, 8d, the display controller 23 is capable of informing the other vehicles around the host vehicle 60 that the host vehicle 60 is going to perform the lane change in the predetermined time. Thereby, before the host vehicle 60 starts the lane change control, the display control 23 is capable of informing the occupants of the other vehicles that the host vehicle 60 is going to perform the lane change. Thus, the other vehicles can inhibit behavior which makes the occupants of the other vehicles feel discomfort, such as increasing the inter-vehicle distance by deceleration in advance.

Furthermore, after the occupant's instruction, the display controller 23 may start to keep the winker indicator 6b turned on, as illustrated in FIG. 2A. Thus, the occupant can recognize that the occupant's instruction is reflected, and can exactly know the condition of the host vehicle 60. Thereafter, when the preparation for the lane change has been completed, the display controller 23 is capable of changing the lighting state of the winker indicator 6b from being continuously turned on to being blinked with no instruction received from the occupant. Moreover, the display controller 23 is capable of changing the lighting state of the turn signals 8c, 8d from being turned off to being blinked, corresponding to the lighting state of the winker indicator 6b. Thereby, the display controller 23 is capable of informing the occupant that the lane change is going to be performed soon. Besides, by blinking the turn signals 8c, 8d, the display controller 23 is capable of informing the other vehicles around the host vehicle 60 that the host vehicle 60 is going to perform the lane change in the predetermined time. Thereby, before the host vehicle 60 starts the lane change control, the display controller 23 is capable of informing the occupants of the other vehicles that the host vehicle 60 is going to perform the lane change. Thus, the other vehicles can inhibit behavior which makes the occupants of the other vehicles feel discomfort, such as increasing the inter-vehicle distance by deceleration in advance.

In addition, the display control device 100 turns on the turn signal 8 after turning on the winker indicator, but before the host vehicle 60 starts the lane change control or the right/right turn control. Thereby, the display control device 100 is capable of informing the occupant that the preparation for the lane change or the right/left turn has been completed and the lane change is going to be performed soon. Furthermore, by blinking the turn signal, the display control device 100 is capable of informing the other vehicles around the host vehicle 60 that the host vehicle 60 is going to perform the lane change in the predetermined time. Thereby, before the host vehicle 60 starts the lane change control, the display control device 100 is capable of informing the occupants of the other vehicles that the host vehicle 60 is going to perform the lane change. Thus, the other vehicles can inhibit behavior which makes the occupants of the other vehicles feel discomfort, such as increasing the inter-vehicle distance by deceleration in advance.

Moreover, the mode in which to display the winker indicator is different between before and after the turn signal 8 is turned on. For example, as illustrated in FIG. 2A, while the surrounding condition detector 22 is preparing the lane change, the display controller 23 keeps the winker indicator 6b turned on, but does not turn on the turn signals 8c, 8d. Thereafter, as illustrated in FIG. 2B, when the preparation for the lane change has been completed, the display controller 23 changes the lighting state of the winker indicator 6b from being continuously turned on to being blinked. Besides, the display controller 23 changes the lighting state of the turn signals 8c, 8d from being turned off to being blinked, corresponding to the lighting state of the winker indicator 6b. In other words, the mode in which to display the winker indicator 6b is the continuous turning on before the turn signals are turned on, and is the blinking after the turn signals are turned on. As discussed above, the mode in which to display the winker indicator 6b is different between before and after the turn signals 8c, 8d are turned on. Since the display controller 23 keeps the winker indicator 6b turned on before turning on the turn signals 8c, 8d, the display controller 23 is capable of informing the occupant that the preparation of the lane change has been started. Thus, the occupant can recognize that the occupant's instruction is reflected, and can exactly know the condition of the host vehicle 60. In addition, by blinking the winker indicator 6b and the turn signals 8c, 8d, the display controller 23 is capable of informing the occupant that the preparation for the lane change has been completed and the lane change is going to be performed soon.

Moreover, after the display control device 100 turns on the turn signal 8, the vehicle control device 200 performs the lane change control or the right/left turn control in the predetermine time. In other words, the predetermined time before the vehicle control device 200 performs the lane change control or the right/left turn control, the display control device 100 turns on the turn signal 8. Thereby, the display control device 100 is capable of informing the other vehicles around the host vehicle 60 that the host vehicle 60 is going to perform the lane change in the predetermined time. Thereby, before the host vehicle 60 starts the lane change control, the display control device 100 is capable of informing the occupants of the other vehicles that the host vehicle 60 is going to perform the lane change. Thus, the other vehicles can inhibit behavior which makes the occupants of the other vehicles feel discomfort, such as increasing the inter-vehicle distance by deceleration in advance.

In addition, the display control device 100 includes the brake lamps 9a, 9b installed in the host vehicle 60. Furthermore, the surrounding image 70 illustrated in FIG. 4A displays the virtual brake lamps 9a', 9b'. Incidentally, the virtual brake lamps 9a', 9b' are different from the actual brake lamps 9a, 9b. The display control device 100 makes the timing of starting to turn on the brake lamps 9a, 9b and the timing of starting to turn on the virtual brake lamps 9a', 9b' different from each other. Thereby, before the system operates the brake, the display control device 100 is capable of informing the occupant that the brake is going to work. This makes the occupant less likely to feel discomfort, even though the brake actually works. In other words, the display control device 100 is capable of making the occupant less likely to feel discomfort while the occupant is riding the vehicle.

Furthermore, the display control device 100 controls the turn signals 8c, 8d, the winker indicator 6b and the display 7 so as to make the timing of starting to turn on the turn signals 8c, 8d, the timing of starting to turn on the indicator 6b, and the timing of staring to turn on the display for showing the preparation in the display 7 different from one another. This makes it possible for the occupant to know which lighting state the turn signals 8c, 8d is in, whether the turn signals 8c, 8d are going to turn on from now, and whether the vehicle control is going to be performed from now. The occupant can therefore know the condition of the host vehicle 60 exactly. Accordingly, the display control device 100 is capable of making the occupant less likely to feel discomfort while the occupant is riding the vehicle.

Other Embodiments

Although the foregoing descriptions have been provided for the embodiment of the present invention, the statement or drawings constituting part of the present disclosure shall not be construed as limiting the present invention. From this disclosure, various alternative embodiments, examples and operational techniques will be apparent to those skilled in the art. For example, the occupant or the system can terminate the lane change or the right/left turn. The timing of the termination is not specifically limited. For example, the occupant or the system can terminate the lane change or the right/left turn after the preparation for the lane change or the right/left turn has been completed. In the case where the preparation for the lane change or the right/left turn has been already completed, both the winker indicator and the turn signal 8 blink, as shown by steps S113 and S115 in FIG. 8A. In this case, if the occupant or the system terminates the lane change or the right/left turn, the display controller 23 turns off both the winker indicator and the turn signal 8. Thereafter, the display controller 23 prohibits the winker indicator and the turn signal 8 from turning on for a predetermined time.

It should be noted that the occupant or the system can terminate the lane change or the right/left turn before the preparation for the lane change or the right/left turn has been completed. In the case where the preparation for the lane change or the right/left turn has not been completed yet, the winker indicator is kept turned on, and the turn signal 8 is turned off, as shown by steps S109 and S111 in FIG. 8A. In this case, if the occupant or the system terminates the lane change or the right/left turn, the display controller 23 turns off the winker indicator. Thereafter, the display controller 23 prohibits the winker indicator and the turn signal 8 from turning on for the predetermined time.

REFERENCE SIGNS LIST

1 object detector
2 host vehicle position detector
3 map acquirer
4 sensor group
5 winker switch
6 meter
6a, 6b winker indicator
7 display
8, 8a, 8b, 8c, 8d turn signal
8a', 8b', 8c', 8d' virtual turn signal
9, 9a, 9b brake lamp
9a', 9b' virtual brake lamp
10, 10a, 10b head lamp
10a', 10b' virtual head lamp
20 controller
21 surrounding image generator
22 surrounding condition detector
23 display controller
30 host vehicle condition detector
31 vehicle control ECU
32 actuator
100 display control device
200 vehicle control device

The invention claimed is:

1. A display control method for a display control device, the display control device including
 a turn signal installed in a vehicle, and
 an indicator for displaying a lighting state of the turn signal to an occupant of the vehicle,
 the display control device controlling the lighting state of the turn signal and a lighting state of the indicator, wherein
 timing of starting to turn on the turn signal and timing of starting to turn on the indicator are different from each other,
 the indicator is continuously turned on before the turn signal is blinked,
 the indicator starts to be continuously turned on in a case where the occupant manipulates a winker switch, and
 the indicator is changed from being continuously turned on to being blinked when the turn signal is blinked.

2. The display control method according to claim 1, wherein
 the display control device includes a display for displaying a control state of vehicle control to be performed based on a run route calculated with a surrounding condition around the vehicle taken into consideration,
 the timing of starting to turn on the indicator, and timing of starting to turn on the control state of the vehicle control to be displayed on the display are set before the timing of starting to turn on the turn signal, and
 the vehicle control includes at least one of automated lane change control, automated left/right turn control, and automated brake control.

3. The display control method according to claim 1, wherein after the indicator is turned on but before the vehicle starts lane change control or left/right turn control, the turn signal is turned on in a case where a system for controlling automated driving determines that a lane change or a right/left turn is allowed.

4. The display control method according to claim 3, wherein the turn signal is turned on a predetermined time before the vehicle performs the lane change control or the left/right turn control.

5. The display control method according to claim 1, wherein a mode in which to display the indicator is different between before and after the turn signal is turned on.

6. The display control method according to claim 1, wherein
 the display control device further includes a brake lamp installed in the vehicle, and
 timing of starting to turn on the brake lamp and timing of starting to turn on a brake indicator for displaying a lighting state of the brake lamp are different from each other.

7. The display control method according to claim 1, wherein after the indicator starts to be continuously turned on, the indicator is turned off in a case where the system for controlling automated driving determines that the lane change or the right/left turn is not allowed.

8. A display control device comprising:
 a turn signal installed in a vehicle;
 an indicator for displaying a lighting state of the turn signal to an occupant of the vehicle; and
 a controller for controlling the lighting state of the turn signal and a lighting state of the indicator, wherein
 the controller
  makes timing of starting to turn on the turn signal and timing of starting to turn on the indicator different from each other,
  keeps the indicator turned on before blinking the turn signal,
  starts to keep the indicator turned on in a case where the occupant manipulates a winker switch, and
  changes the indicator from being continuously turned on to being blinked when blinking the turn signal.

* * * * *